(12) United States Patent
Ollila

(10) Patent No.: US 9,778,480 B2
(45) Date of Patent: Oct. 3, 2017

(54) TECHNIQUES FOR OPTICAL IMAGE STABILIZATION USING MAGNETIC SHAPE MEMORY ACTUATORS

(71) Applicant: INTEL CORPORATION, Santa Clara, CA (US)

(72) Inventor: Mikko Ollila, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 34 days.

(21) Appl. No.: 14/497,859

(22) Filed: Sep. 26, 2014

(65) Prior Publication Data

US 2016/0091729 A1  Mar. 31, 2016

(51) Int. Cl.
| | |
|---|---|
| *H04N 5/228* | (2006.01) |
| *H04N 5/225* | (2006.01) |
| *G02B 27/64* | (2006.01) |
| *H04N 5/232* | (2006.01) |
| *G02B 27/01* | (2006.01) |

(52) U.S. Cl.
CPC ....... *G02B 27/646* (2013.01); *G02B 27/0172* (2013.01); *H04N 5/2252* (2013.01); *H04N 5/2253* (2013.01); *H04N 5/23248* (2013.01); *H04N 5/23287* (2013.01); *G02B 2027/0138* (2013.01); *G02B 2027/0178* (2013.01)

(58) Field of Classification Search
CPC ...... G06T 2207/10068; G02B 23/2415; G02B 23/243; G02B 27/646; H04N 5/23248; H04N 5/23254; G03B 2205/0007; G03B 2205/0053
USPC ....... 348/208.99, 154, 169, 357; 396/52, 13, 396/133; 359/554
See application file for complete search history.

(56) References Cited

U.S. PATENT DOCUMENTS

| | | | |
|---|---|---|---|
| 2005/0052537 A1 | 3/2005 | Mizusawa | |
| 2006/0033818 A1* | 2/2006 | Wada | G03B 17/00 348/208.11 |

(Continued)

FOREIGN PATENT DOCUMENTS

| | | |
|---|---|---|
| JP | 2001249276 | 9/2001 |
| JP | 2008011119 | 1/2008 |

OTHER PUBLICATIONS

International Search Report and Written Opinion received for PCT Patent Application PCT/US2015/046865, mailed Feb. 19, 2016, 12 pages.

*Primary Examiner* — Xi Wang

(57) ABSTRACT

Various embodiments are generally directed to techniques for using MSM actuators to minimize the consumption of electric power and/or the quantity of components in implementing OIS in an image capture device. An apparatus may include a camera pivotally mounted within an endpiece of a casing, the camera including an image capture element to capture an image of an object along a line of sight of the image capture element; an actuator of elongate shape coupled to the camera to exert a mechanical force to pivot the camera about an axis, the elongate shape of the actuator extending into a relatively thin and elongate portion of the casing that is coupled to and extends from the endpiece; and a countering movement component to operate the actuator to pivot the camera about the axis in a countering movement to provide OIS to the camera. Other embodiments are described and claimed.

25 Claims, 20 Drawing Sheets

(56) References Cited

U.S. PATENT DOCUMENTS

| | | | |
|---|---|---|---|
| 2007/0030442 A1* | 2/2007 | Howell | G02C 11/10 351/158 |
| 2008/0007620 A1* | 1/2008 | Wang | H04N 5/232 348/154 |
| 2008/0100715 A1* | 5/2008 | Chang | A61K 36/185 348/208.7 |
| 2011/0193963 A1* | 8/2011 | Hess | H04N 5/2252 348/157 |
| 2011/0211821 A1* | 9/2011 | Park | G03B 5/02 396/55 |
| 2012/0019675 A1* | 1/2012 | Brown | G02B 27/646 348/208.2 |
| 2012/0050668 A1* | 3/2012 | Howell | G02C 11/10 351/158 |
| 2014/0009631 A1* | 1/2014 | Topliss | G02B 27/646 348/208.11 |
| 2014/0267646 A1 | 9/2014 | Na'aman et al. | |
| 2014/0333785 A1 | 11/2014 | Lee | |

* cited by examiner

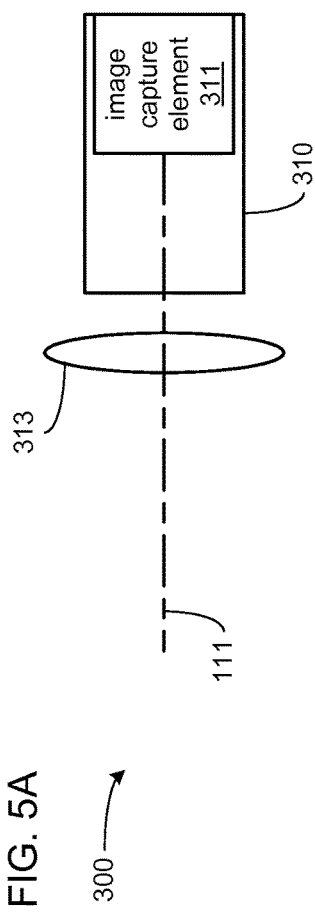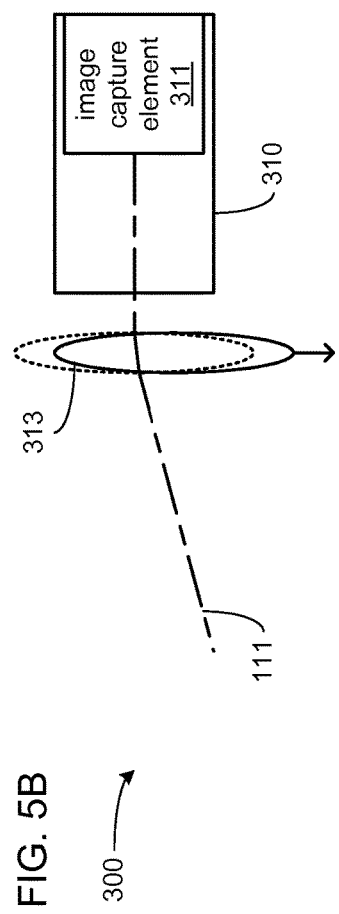
FIG. 5A
FIG. 5B

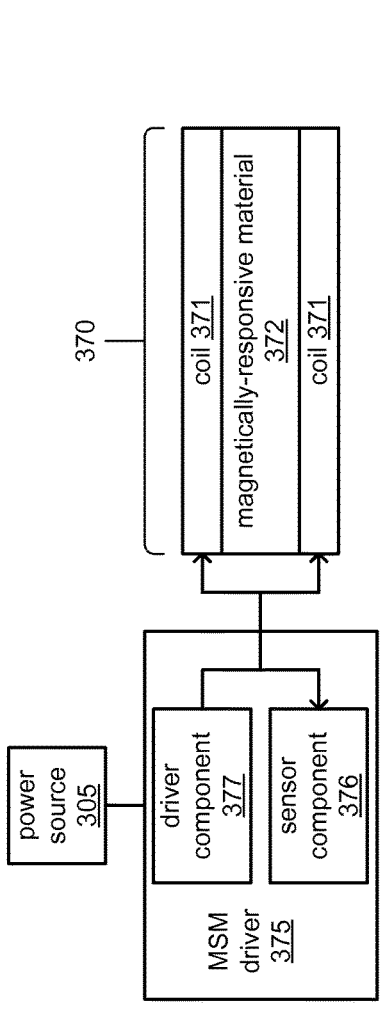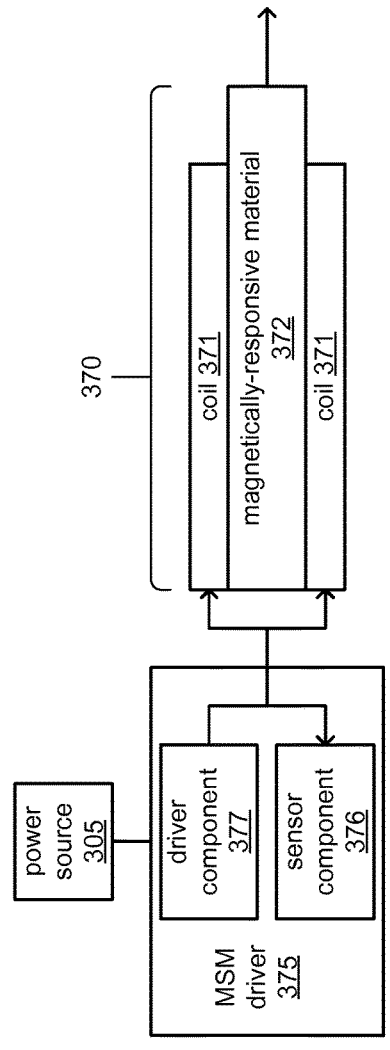
FIG. 7A
FIG. 7B

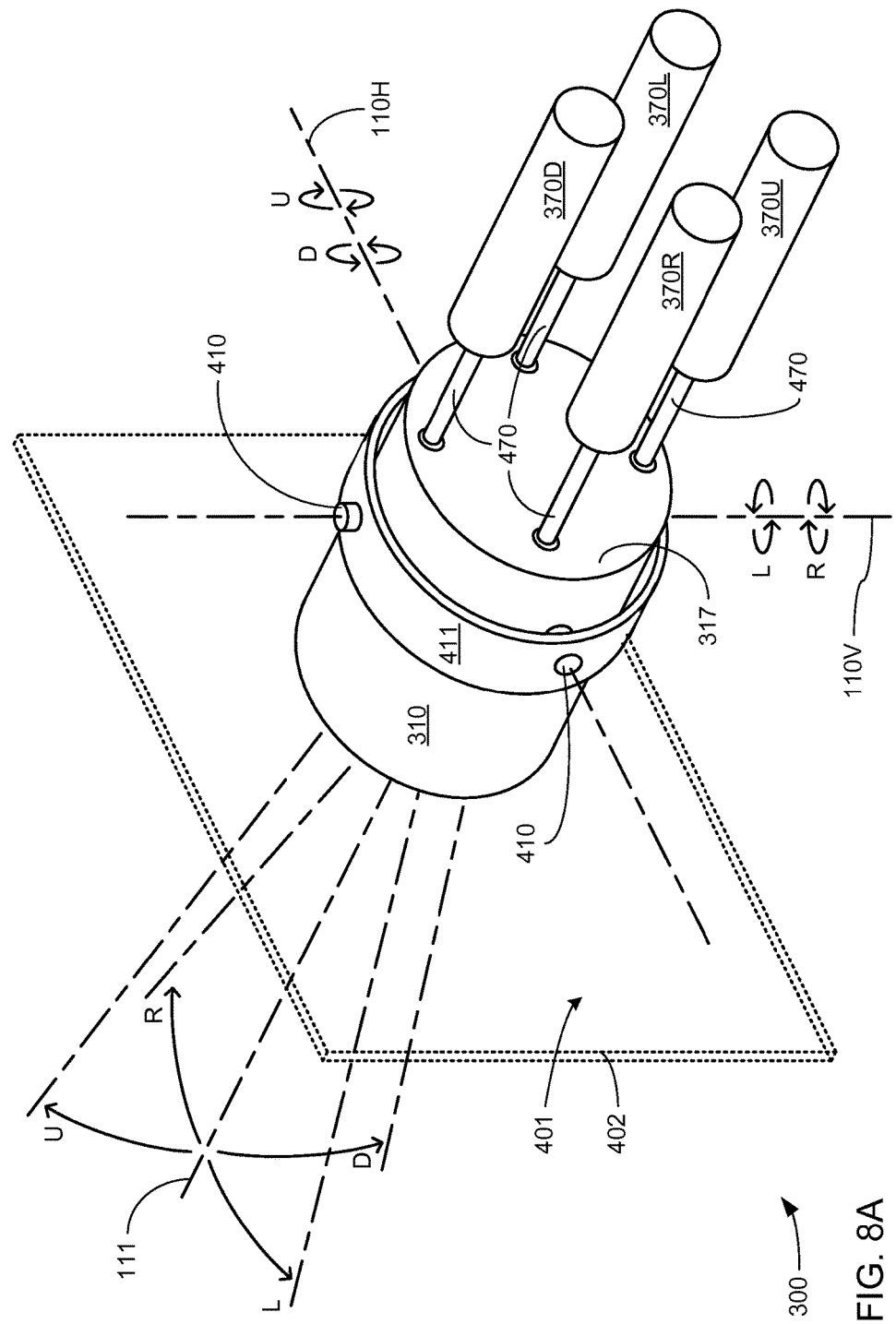

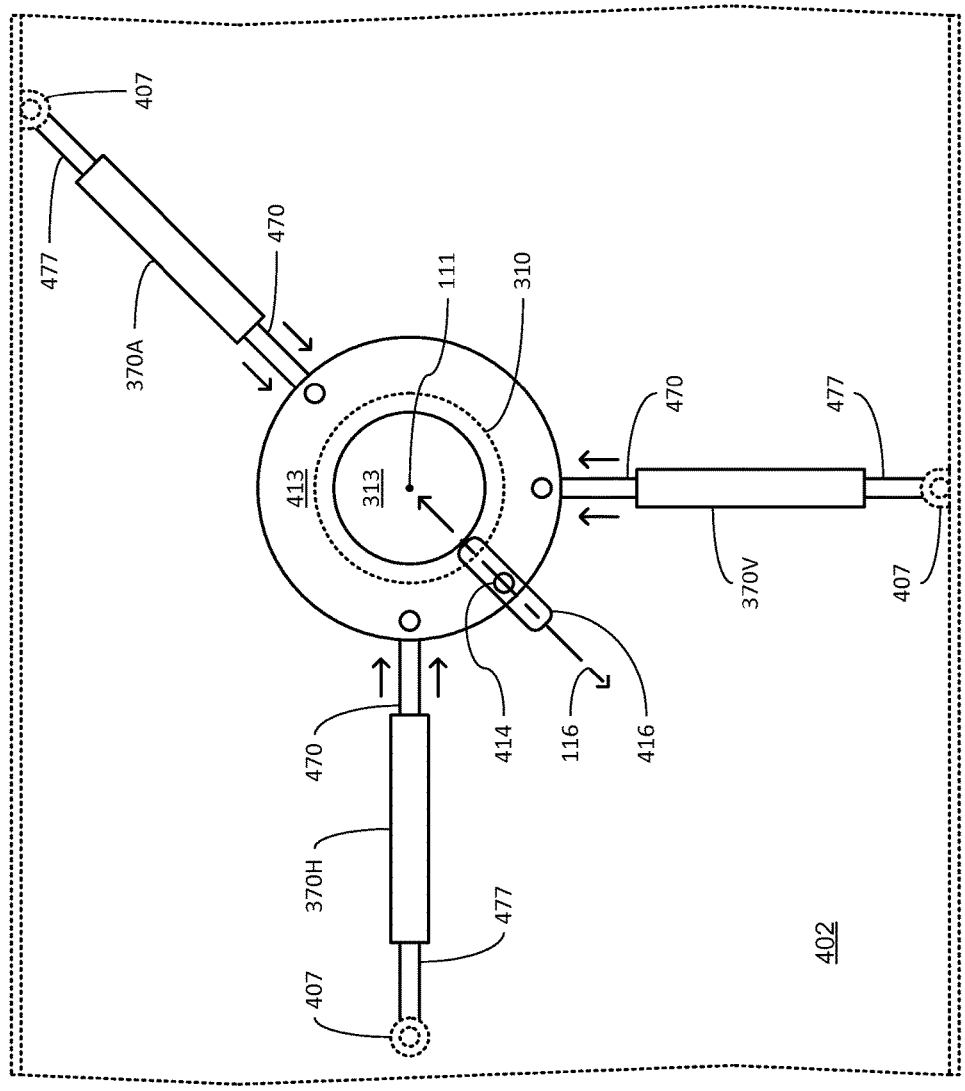

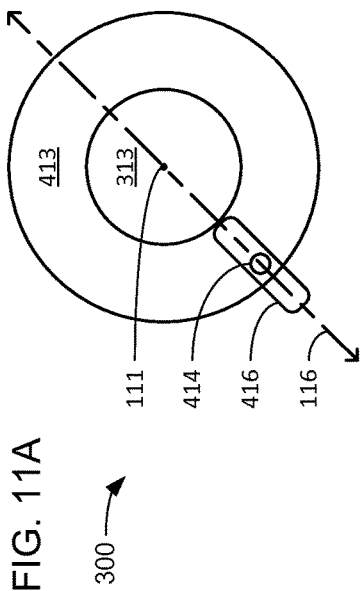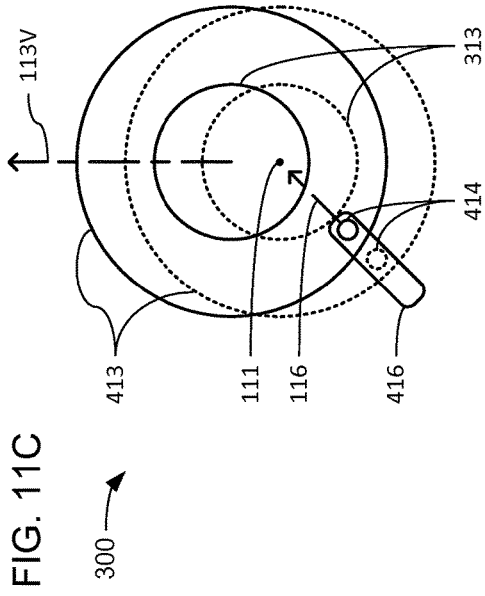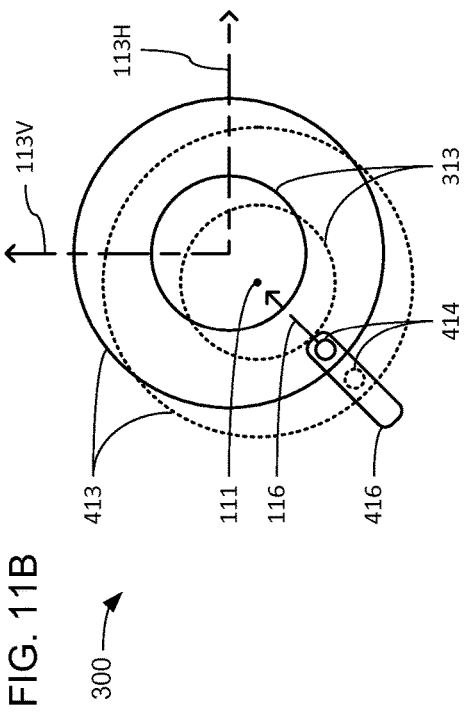

TECHNIQUES FOR OPTICAL IMAGE STABILIZATION USING MAGNETIC SHAPE MEMORY ACTUATORS

BACKGROUND

As it has become commonplace to incorporate cameras into portable electronic devices, it has started to become commonplace to include optical image stabilization (OIS) in those devices to improve the quality of the images captured with those cameras. However, as familiar to those skilled in the art, the addition of such features as OIS, automated color correction, automated light level control, etc., often increases the amount of electric power consumed from what is usually a limited source of electric power (e.g., a battery) during the use of such devices to capture images.

By way of example, the inclusion of OIS often entails the addition of multiple voice coil motor (VCM) actuators to move about at least a portion of a camera in response to relatively small movements arising from unsteadiness on the part of a person physically supporting the portable electronic device to capture an image. Multiple VCM actuators are usually employed to counter relatively small horizontal and vertical movements that arise from such unsteadiness, and not from a deliberate movement for image panning, etc. Unfortunately, although VCM actuators are quite capable of effecting relatively small movements of at least a portion of a camera to counter relatively small movements arising from unsteadiness in the physical support of a portable electronic device, such use of VCM actuators does have drawbacks.

VCM actuators have no ability to hold an object in a chosen position unless continuously provided with electric power such that an object either moved to a chosen position or held there by a VCM actuator is able to move freely once electric power is no longer provided. As a result, some implementations of OIS include the use of springs to assist VCM actuators in holding at least a portion of a camera at a location to which a VCM actuator has been used to move it. Unfortunately, aside from adding undesirably to the quantity and weight of parts employed in implementing OIS, every mechanical spring has a resonance frequency at which it can be caused to begin vibrating such that electric power may still be need to be applied to a VCM actuator on a frequent basis to counter such a vibration.

Further, detecting the position of an object moved by a VCM actuator typically requires a separate sensor component. For implementations of OIS, this typically results in the need to add two or more sensor components to detect the current position of at least a portion of a camera moved about by VCM actuators, thereby again adding undesirably to the quantity and weight of parts employed in implementing OIS.

BRIEF DESCRIPTION OF THE DRAWINGS

FIGS. 5A and 5B, together, illustrate an example optical component configuration to provide OIS according to an embodiment.

FIGS. 7A and 7B, together, illustrate an example actuator component configuration to provide OIS according to an embodiment.

FIGS. 8A and 8B, together, illustrate an example physical configuration of actuators and other components to pivot a camera.

FIGS. 10A and 10B, together, illustrate an example physical configuration of actuators and other components to move a lens.

FIGS. 11A, 11B, 11C, 11D and 11E, together, illustrate various examples of movement of the lens through use of opposing forces exerted by multiple actuators according to an embodiment.

DETAILED DESCRIPTION

Figure 1:
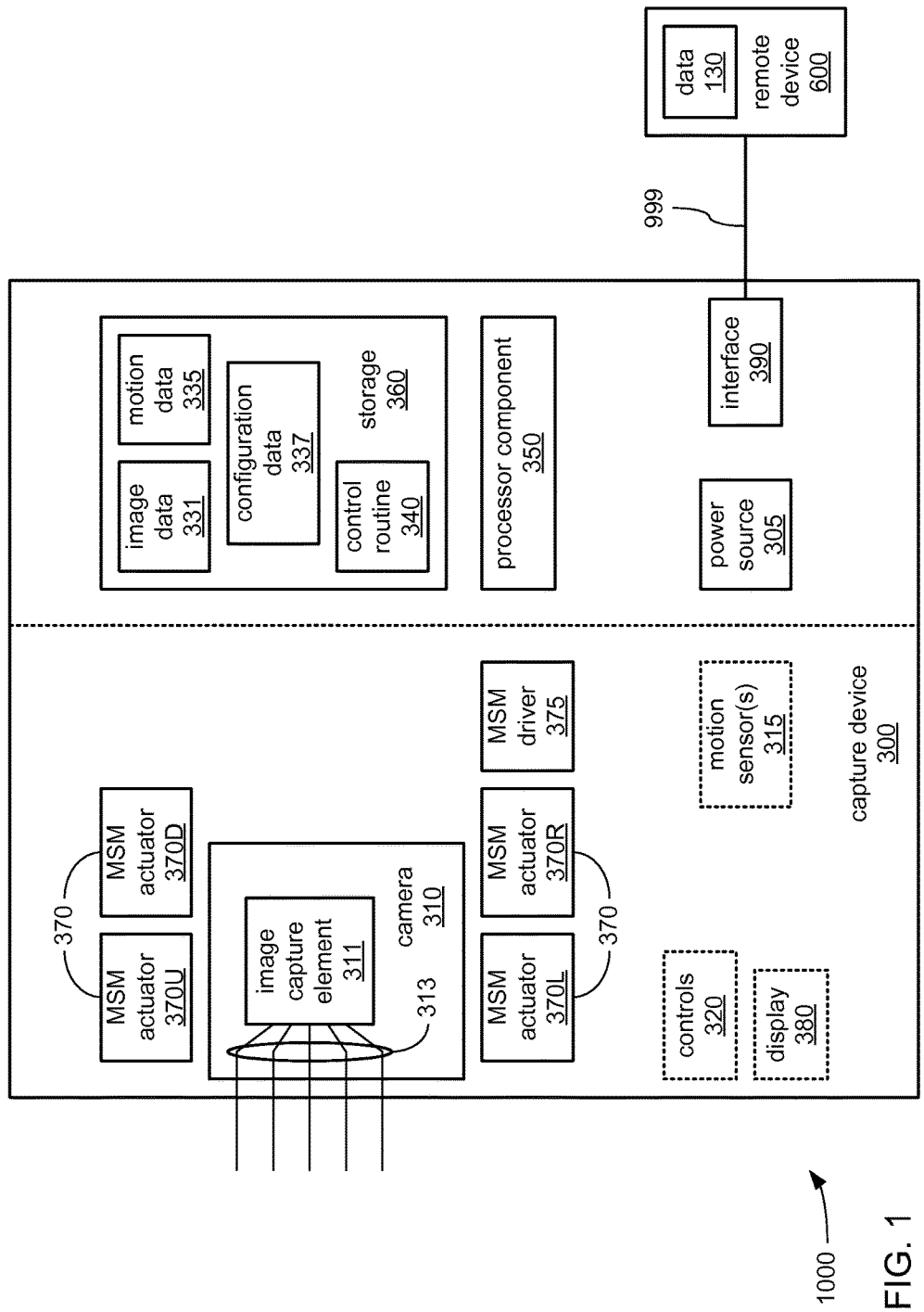
FIG. 1 illustrates an example embodiment of an image capture system.

Various embodiments are generally directed to techniques for using magnetic shape memory (MSM) actuators to minimize the consumption of electric power and/or the quantity of components in implementing optical image stabilization (OIS) in an image capture device. Each MSM actuator includes a portion of material that changes a dimension and/or a shape as a result of a molecular level response to a magnetic field. Such a change in dimension and/or shape is typically relatively small (e.g., 5% to 15%), but can be made to occur relatively quickly and can be used to exert a considerable amount of mechanical force. Multiple MSM actuators arranged to exert opposing mechanical forces may be incorporated into a portable electronic device that incorporates a camera to move about at least a portion of the camera to implement OIS. An analysis of movement in images captured by the camera and/or indications of movement received from one or more sensors may be employed to detect motion that includes relatively small movements of the portable electronic device that arise from unsteadiness in physically supporting the personal electronic device while capturing images with its camera. Measurements of electrical characteristics of one or more of the multiple MSM actuators may be employed to determine the current position of the portion of the camera moved about by the multiple MSM actuators. The multiple MSM actuators may then be selectively provided with electric power to effect relatively small countering movements of that portion of the camera to counter the relatively small movements of the portable electronic device arising from such unsteady support to provide OIS. Also, to conserve electric power from what may be a limited power source of the capture device (e.g., a battery), electric power may cease to be provided to the MSM actuators at times when such countering movements are determined to not be required.

To detect relatively small movements arising from unsteady supporting of a portable electronic device, the very same camera of that capture device for which OIS is provided may be employed to recurringly capture images over time and those captured images may be compared to identify differences therebetween arising from motion imparted to the portable electronic device. Alternatively or additionally, one or more motion sensors (e.g., one or more accelerometers and/or gyroscopes) may be incorporated into the portable electronic device and operated to detect motion of the portable electronic device. Regardless of the manner in which motion of the portable electronic device is detected, the speed and extent of any such detected motion may be analyzed to distinguish relatively small movements associated arising from such unsteady support from other movements that may be more deliberate in nature, such as turning or another movement of the portable electronic device to effect a panning motion or other visual effects during the capture of motion video, etc.

A driver circuit employed to operate multiple MSM actuators incorporated into the personal electronic device may be operable to use electrical measurements associated with coils of each of the multiple MSM actuators to determine the current position to which at least a portion of the camera that is moved about by the MSM actuators to provide OIS. Such measurements may, in some embodiments, be taken as electric power is applied to one or more of the multiple MSM actuators to move that portion of the camera about. The current location of that portion may be taken into account in deriving a countering movement to use to counter a relatively small movement associated with unsteady support of the portable electronic device. By way of example, where at least a portion of the camera has already been moved up to or relatively close to a limit of movement in a particular direction, and where a countering movement would entail further movement in that particular direction, the distance of movement of the countering movement may be reduced or the countering movement may not be performed.

Upon deriving a countering movement, a determination may be made as to which one or more of the multiple MSM actuators to use to effect the countering movement and/or the manner in which each of the one or more of the multiple MSM actuators is to be operated to effect the countering movement. Again, the current location of whatever portion of the camera is moved about by the multiple MSM actuators may be taken into account in determining which one or more of the multiple MSM actuators are used and/or the manner of their use to effect the countering movement. At least in selecting which of the one or more of the multiple MSM actuators to use, the direction in which each of the multiple MSM actuators is configured to exert force may be taken into account.

In some embodiments, two pairs of MSM actuators may be employed to move all or substantially all of the camera in a pivoting manner to pivot the line of sight of an image capture element of the camera to provide OIS. Such pivoting movement may be configured to mimic the motion of a human eyeball within an eye socket to pivot the line of sight of the camera by a relatively small angle to counter a relatively small movement determined to arise from unsteady support of the portable electronic device. The pivoting may be enabled to occur in two angular dimensions, each under the control of one of the pairs of MSM actuators. In some embodiments, the camera may be physically coupled to a portion of the interior of the casing of the portable electronic device by being mounted at least partially within the interior space of a gimbal to enable the pivoting movement of the camera under the control of the two pairs of MSM actuators. In other embodiments, the camera may be physically coupled to a portion of the interior of the casing by being mounted thereto through a universal joint to enable the pivoting movement of the camera under the control of the two pairs of MSM actuators.

Within each of the pairs of MSM actuators, each of the two MSM actuators may be selected and/or configured to exert force in a direction opposite the other. The two MSM actuators of at least one of the pairs may be rigidly coupled to each other to form what may be referred to as "push-push" double actuator that is coupled to the camera by a single linkage. Force in either of the two opposing directions may be exerted on the camera through that single linkage depending on which one of the two MSM actuators is driven with electric power. Alternatively or additionally, the two MSM actuators of at least one other of the pairs may be indirectly coupled through separate linkages of each of the two MSM actuators to the camera in a manner that each may exert a force in opposition to the other indirectly through the camera. Regardless of the exact manner in which MSM actuators within each pair may act in opposition to each other, all four of the MSM actuators may be of a generally elongate physical configuration. Further, all four of the MSM actuators may be arranged to extend lengthwise within an elongate portion of a casing that defines, is formed integrally with or is otherwise physically coupled to at least a front endpiece of a temple of eyewear in embodiments in which the personal electronic device is the eyewear or is incorporated into the eyewear (e.g., eyeglasses, reading glasses, smart glasses, etc.).

In other embodiments, a triplet of MSM actuators may be employed to move at least a lens of the camera separately from at least an image capture element of the camera to provide OIS. In other words, at least one component of the camera may be made movable relative to at least one other component of the camera. More specifically, the lens may be moved by the MSM actuators in two dimensions within a plane that crosses a line of sight of the image capture element to use refraction to bend light following the line of sight by a relatively small angle to counter a relatively small movement determined to arise from unsteady support of the portable electronic device. At least the image capture element of the camera may be supported within a casing of the portable electronic device in a manner that prevents at least the image capture element from moving relative to the casing. At least the lens may be supported with at least a sliding pivot point that is off center from the center of the lens, that enables a sliding movement of at least the lens at a non-perpendicular angle with respect to the direction(s) in which one or more of the MSM actuators exerts force, and that enables pivoting of at least the lens about the sliding pivot point. Two of the MSM actuators may be selected and/or configured to exert force to move at least the lens in a manner causing the sliding and/or pivoting movements of at least the lens in a direction away from a resting position of at least the lens. A third one of the MSM actuators may be selected and/or configured to exert force in opposition to the force exerted by the other two MSM actuators to move at least the lens back towards the resting position.

The sliding pivot point may be implemented with a projection (e.g., an elongate pin) that extends into or through an elongate slot. The pin may enable pivoting of at least the lens at any point along the length of the slot under the control of two of the MSM actuators. The slot may be formed through a piece of sheet metal or other suitable sheet of material that enables the projection to project therethrough. Alternatively or additionally, the slot may be implemented as a groove formed in a surface of a piece of metal or other suitable material that the projection is able to project into. In some embodiments, the projection may be carried by, formed integrally with or otherwise physically coupled to at least the lens, and the slot may be formed in or through a piece of material formed integrally with or otherwise coupled to a portion of the interior of the casing of the portable electronic device. In other embodiments, the projection may be carried by, formed integrally with or otherwise physically coupled to a portion of the interior of the casing, and the slot may be formed in or through a piece of material formed integrally with or otherwise coupled to at least the lens. State differently, in differing embodiments, it may be either the projection or the slot that is caused to move relative to the casing by the MSM actuators to effect such sliding and pivoting movements.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
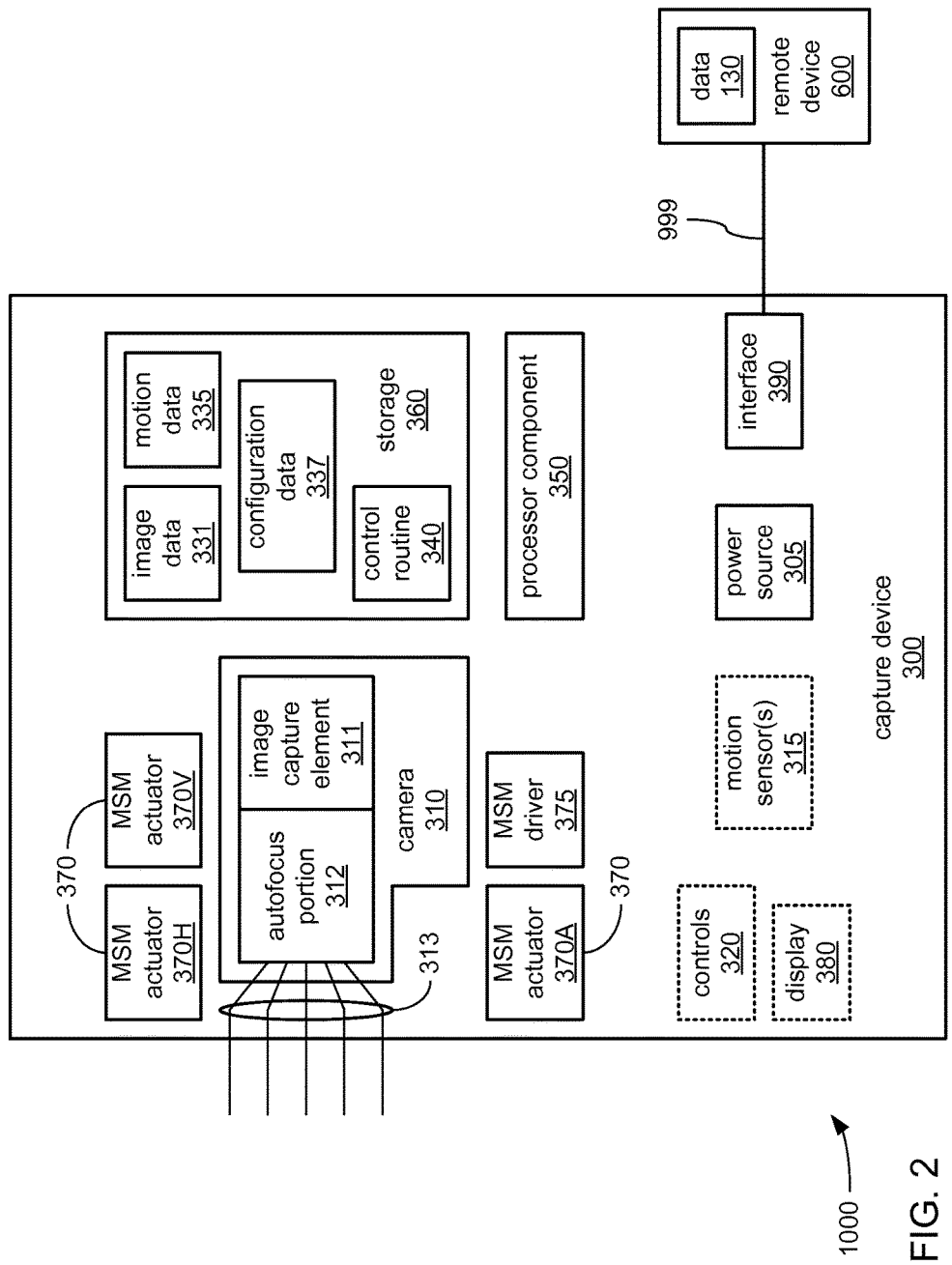
FIG. 2 illustrates an alternate example embodiment of an image capture system.

FIGS. 1 and 2 each illustrate a block diagram of an embodiment of an image capture system 1000 incorporating one or more of a capture device 300 and a remote device 600. As depicted in both FIGS. 1 and 2, the capture device 300 and the remote device 600 may exchange image data 331 that may be captured by a camera 310 of the capture device 300. The camera 310 may be caused to move relative to at least a portion of a casing 400 of the capture device 300 by multiple MSM actuators 370 as part of providing OIS to improve the quality of the images captured by the camera 310 and stored as the image data 331. The multiple MSM actuators 370 may be operated to do so by an MSM driver 375 under the control of a control routine 340 in response to relatively small movements that are determined to arise from unsteady physical support of the capture device 300, such as may occur as a result of a person physically supporting the capture device 300 with one or both hands to use the camera 310 to capture images.

As depicted, these computing devices 300 and 600 exchange signals conveying data (e.g., the image data 331) through a network 999. However, one or more of these computing devices may exchange other data entirely unrelated to captured images, the capturing of images and/or the provision of OIS for capturing images with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. In alternate embodiments, the capture device 300 and the remote device 600 may be coupled in an entirely different manner. In still other embodiments, the image data 331 may be conveyed among these computing devices via removable media (e.g., a FLASH memory card, optical disk, magnetic disk, etc.).

As depicted in both FIGS. 1 and 2, in various embodiments, the capture device 300 may incorporate one or more of the processor component 350, a storage 360, a power source 305, controls 320, a display 380, and an interface 390 to couple the capture device 300 to the network 999. The capture device 300 may also include one or more of the camera 310, motion sensor(s) 315, the multiple MSM actuators 370 and the MSM driver 375. The storage 360 may store one or more of the image data 331, sensor data 335, configuration data 337 and a control routine 340.

Turning briefly to FIG. 1, the camera 310 may incorporate an image capture element 311 and a lens 313, but may not incorporate an autofocus mechanism. Further, the multiple MSM actuators 370 may include one or more of individual MSM actuators 370D, 370L, 370R and 370U, of which the MSM actuators 370D and 370U may each be arranged to exert force in opposition to the other to pivot the camera 310, and of which the MSM actuators 370L and 370R may be similarly arranged. As also depicted, the capture device 300 may be implemented either in a single-piece form in which at least the majority of its components are incorporated into a single casing, or in a two-piece form in which at least the majority of its components are distributed among two physically separate casings that may be coupled by electrically and/or optically conductive cable to exchange signals therebetween.

As will be explained in greater detail, the capture device 300 may be implemented as eyewear worn on the head of a person in a manner that is at least in close proximity to one or both eyes and/or that extends across the field of vision of one or both eyes (e.g., eyewear such as eyeglasses, reading glasses, smart glasses, etc.). If the capture device is implemented in a single-piece form as eyewear, then at least the single casing may be coupled to, incorporated into or otherwise carried by the frame of the eyewear. If the capture device is implemented in a two-piece form as eyewear, then at least the camera 310, the motion sensor(s) 315, and the MSM actuators 370 may be incorporated into the one of the two casings coupled to, incorporated into or otherwise carried by the frame of the eyewear, while others of the components are incorporated into the other casing that may be shaped and/or sized to be carried in a pocket, clipped to a belt, etc. In such eyewear implementations, the multiple MSM actuators 370 may extend from their couplings to the pivotally mounted camera 310 and into a relatively thin and elongate portion of the casing that defines a temple of the eyewear. However, it should be noted that although eyewear implementations of the capture device 300 are specifically depicted and discussed herein, other embodiments are possible in which the casing may have an entirely different physical configuration having nothing to do with eye, but in which the camera 310 is pivotally mounted and in which the multiple actuators 370 that pivot the camera 310 extend into a relatively thin and elongate portion of that casing.

Figure 3A:
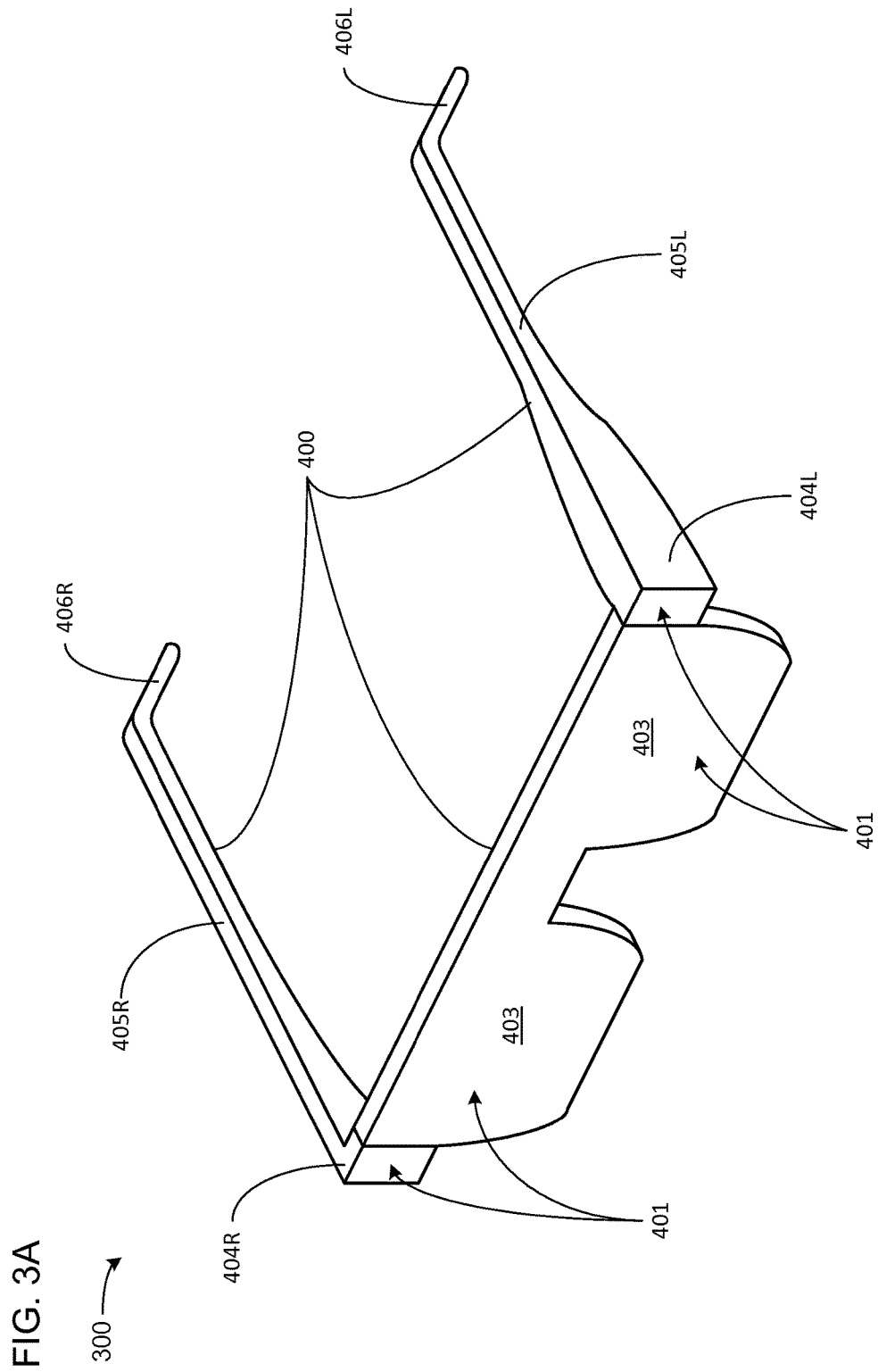
FIGS. 3A and 3B, together, illustrate an example physical configuration of a casing and other components of a capture device according to an embodiment.
Figure 3B:
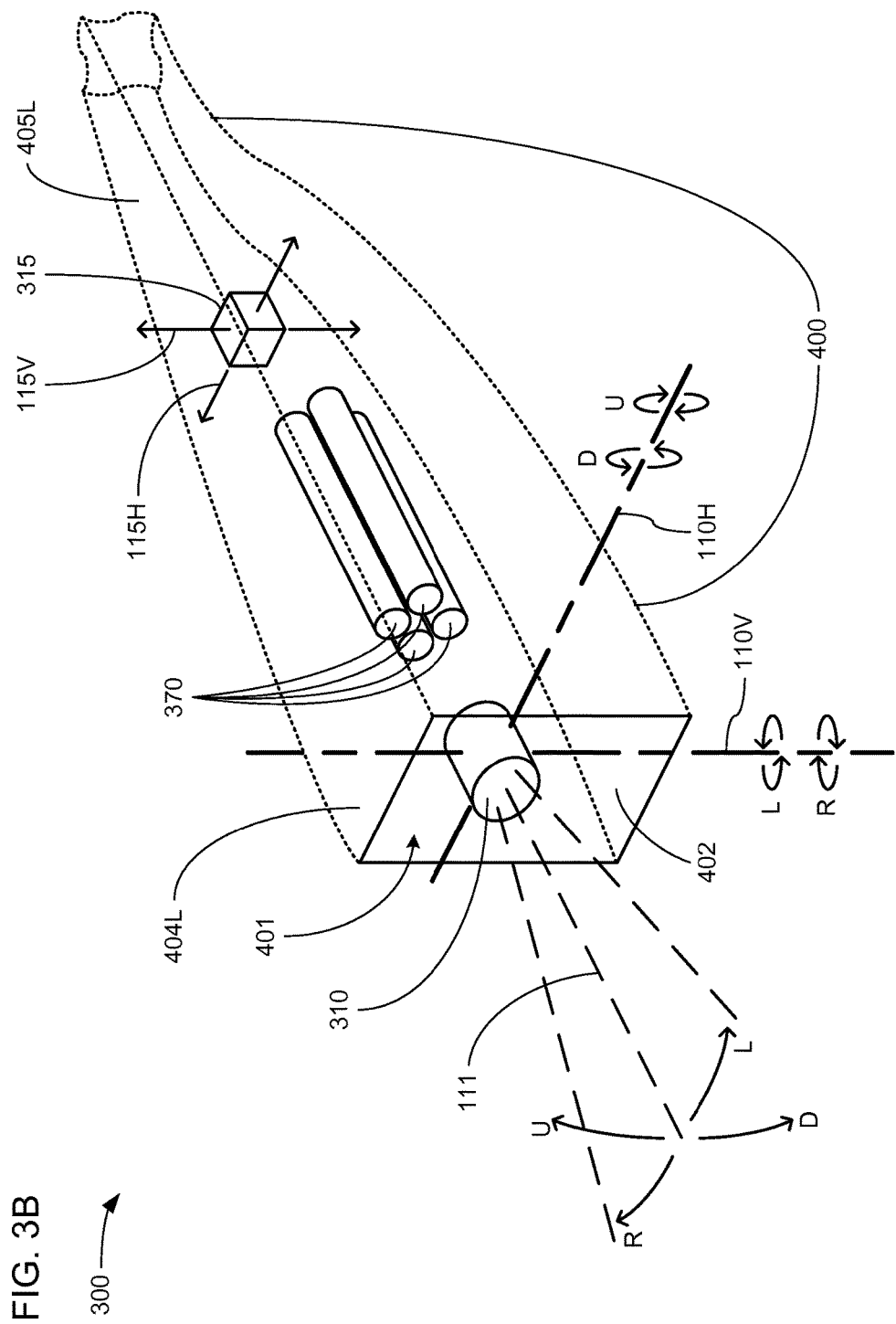

FIGS. 3A and 3B, together, depict an example embodiment of a physical configuration of the capture device 300 of FIG. 1 in greater detail. Turning to FIG. 3A, at least a portion of the casing 400 of the capture device 300 may take the shape of or be otherwise integrated into eyewear to be worn about a portion of a person's head in the vicinity of one or both of their eyes, and/or one or both of their ears. The casing may include a front portion 403 that may be made up at least partially of transparent material through which a person may see (e.g., one or a pair of lenses providing a shaded view and/or a corrective view), a left temple 405L and a right temple 405R. Each of the temples 405L and 405R may include an earpiece 406L and 406R to engage a portion of an earlobe, and front endpiece 404L and 404R, respectively, at which opposing left and right ends of the front portion 403 may be joined via a hinge or other foldable or rigid connection. The front portion 403, along with portions of the front endpieces 404L and 404R, may define one or more front surfaces 401 that are so called as a result of becoming the surfaces that face forwardly from a person at time when that person wears the depicted eyewear form of the capture device 300.

Turning to FIG. 3B, at least the camera 310, the sensor 315 and the MSM actuators 370 may be incorporated into at least the front endpiece of one of the temples of the casing 400, such as the front endpiece 404L of the left temple 405L as depicted in FIG. 3B in a close-up perspective view. As depicted, the line of sight 111 of the image capture element 311 of the camera 310 may extend forward from the location of the camera 310 within the front endpiece 404L and through a sheet-like portion 402 of the front endpiece 404L that may form a portion of the front surface 401. The sheet-like portion 402 may be transparent or may have an aperture (not shown) formed therethrough at least at the location of the line of sight 111 to enable light from an object of which an image is to be take to reach the camera 310. As also depicted, the multiple MSM actuators 370 may be positioned adjacent a portion of the camera 310 that extends towards the earpiece 406L to enable each of the MSM actuators 370 to engage that portion of the camera 310. Each of the multiple MSM actuators 370 may each have a generally elongate shape and may be positioned within the left temple 405L to extend lengthwise within the interior of a relatively thin and elongate portion of the casing 400 that extends between and connects the front endpiece 404L and the earpiece 406L (e.g., a rear endpiece).

It should again be noted, however, that although the front endpiece 404L in which the camera 310 is pivotally positioned and the relatively thin and elongate portion of the casing 400 between the front endpiece 404L and the earpiece 406L are depicted and described herein as portions of eyewear, other embodiments are possible in which the camera 310 may be pivotally positioned within an endpiece of a relatively thin and elongate portion of the casing 400 that does not define and is not otherwise associated with a portion of eyewear. By way of example, such a relatively thin and elongate portion of the casing 400 may take the form of a relatively thin and elongate probe used in medical and/or industrial applications in which the camera 310 is pivotally positioned within an endpiece of that relatively thin and elongate portion of the casing 400 that is inserted into a cavity of a body, a void within a wall, a portion of a jet engine having blades to be inspected, etc. In such other applications, the quality of the images captured may be as easily susceptible to the unsteadiness of the hand(s) of an operator.

As will be explained in greater detail, the multiple MSM actuators 370 may cause the camera 310 to pivot about two axes, such as the depicted axes 110H and 110V. In some embodiments, the MSM actuators 370 may be so operated in response to particular types of motion detected by an analysis of multiple images captured by the camera 310 over time. In other embodiments, the MSM actuators 370 may be operated to cause such pivoting in response to particular types of motion detected by the motion sensor 315 along two other axes, such as the depicted axes 115H and 115V. Although, as depicted, the directions in which the axes 110H and 110V extend may parallel the directions in which the axes 115H and 115V extend, embodiments are possible in which this is not the case.

At times when the capture device 300 is worn by an operator or otherwise carried or supported such that the front surface 401 faces in a direction that is generally horizontal with the generally elongate shapes of the front portion 403 and both of the temples 405L and 405R all extending generally horizontally, the axis 110V may be put into a vertical orientation and the axis 110H may be put into a horizontal orientation extending parallel to the front surface 401. With the axes 110H and 110V in such orientations, the range of pivoting motion afforded to the camera 310 enables the line of sight 111 of the image capture element 311 of the camera 310 to be pivoted about the axis 110V to an angle to the left (following the curving "L" arrow) or to the right (following the curving "R" arrow), and to be pivoted about the axis 110H to a higher angle of elevation (following the curving "U" arrow "upwards") or a lower angle of elevation (following the curving "D" arrow "downwards").

Turning briefly back to FIG. 2, the camera 310 may incorporate an image capture element 311 and an autofocus portion 312, but the lens 313 of the camera 310, despite being a necessary component of the camera 310, may be physically separate from the rest of the camera 310 such that it may be movable relative to at least the capture element 311

(unlike the camera 310 of FIG. 1 into which the lens 313 was integrated). As familiar to those skilled in the art, the autofocus portion 312 may include another lens that is moved along the line of sight 111 of the image capture element 311 to adjust focus based on an indication of a distance to an object of which an image is to be captured. Thus, light passing through the lens 313 from the object of which an image may be captured may also pass through one or more additional lenses within the camera 310 before reaching the image capture element 311. Further, the multiple MSM actuators 370 may include one or more of individual MSM actuators 370A, 370H and 370V that may be arranged so that each of these three MSM actuators exerts force at least partially in opposition to forces exerted by each of the other two.

Figure 4:
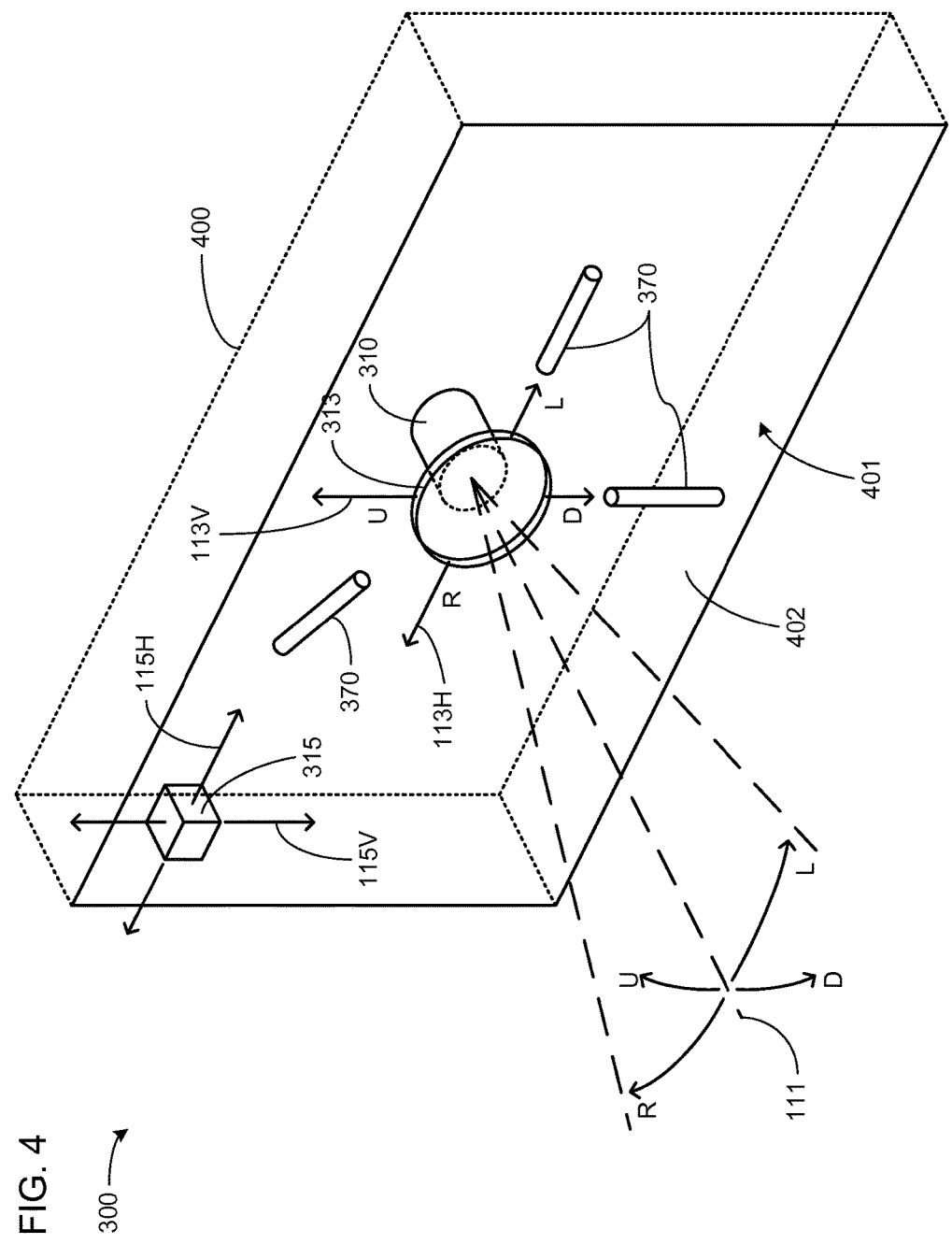
FIG. 4 illustrates an alternate example physical configuration of a casing and other components of a capture device according to an embodiment.

FIG. 4 depicts an example embodiment of a physical configuration of the capture device 300 of FIG. 2 in greater detail. As depicted, the casing 400 of the capture device 300 may take a generally rectangular shape such as that commonly taken by cellular telephones, smartphones, PDAs, etc. Thus, the casing 400 may define a substantially flat front surface 401 that is so called as a result of becoming the surface that faces forwardly from a person at time when the person wears holds the capture device 300 in one or both hands to use the camera 310 to capture an image.

At least the camera 310, the lens 313, the sensor 315 and the MSM actuators 370 may be incorporated into the casing 400. As depicted, the line of sight 111 of the image capture element 311 of the camera 310 may extend forward from the location of the camera 310 within the casing 400 and through a sheet-like portion 402 of the casing that may form at least a portion of the front surface 401. The sheet-like portion 402 may be transparent or may have an aperture (not shown) formed therethrough at least at the location of the line of sight 111 to enable light from an object of which an image is to be take to reach the lens 313 and then the camera 310. As also depicted, the multiple MSM actuators 370 may be positioned around the periphery of the lens 313 to enable each to engage an edge of the lens 313 (or of a frame that may hold the lens 313) from differing directions. Again, each of the MSM actuators 370 may have a generally elongate shape, and may be arranged around the periphery of the lens 313 in what may be a radiating pattern that extends away from the periphery of the lens 313. In some embodiments, the MSM actuators 370 may be positioned about the lens 313 such that their lengthwise dimensions all extend within a single plane, and that single plane may be parallel to a portion of the casing that defines at least a portion of the front surface 401.

As will be explained in greater detail, the multiple MSM actuators 370 may cause the lens 313 to move about in what may be a sliding motion within a plane defined by two axes, such as the depicted axes 113H and 113V. That plane may extend across the line of sight 111 at an angle perpendicular to the line of sight 111 and/or that plane may be parallel to a portion of the casing that defines at least a portion of the front surface 401. At times when the capture device 300 is carried or supported such that the front surface 401 faces in a direction that is generally horizontal, the axis 113V may be put into a vertical orientation and the axis 113H may be put into a horizontal orientation. In some embodiments, the MSM actuators 370 may be so operated in response to particular types of motion detected by an analysis of multiple images captured by the camera 310 over time. In other embodiments, the MSM actuators 370 may be operated to cause such a sliding motion in response to particular types of motion detected by the motion sensor 315 along two axes, such as the depicted axes 115H and 115V. Although, as depicted, the directions in which the axes 113H and 113V extend may parallel the directions in which the axes 115H and 115V extend, embodiments are possible in which this is not the case.

The range of sliding motion afforded to the lens 313 enables the line of sight 111 of the image capture element 311 of the camera 310 to be bent in a range of directions in two angular dimensions by refraction as a beam of light following the path of the line of sight 111 passes through the lens 313. As a result, the line of sight 111 emanating from the image capture element 311 within the camera 310 may be bent within the lens 313 in a manner that effectively pivots the portion of the line of sight 111 that extends from the lens 313 and further away from the camera 310. FIGS. 5A and 5B, together, depict an example of such pivoting caused by such movement of the lens 313 relative to the camera 310. As again depicted, the camera 310 may include the image capture element 311 having the line of sight 111. However, as previously discussed, the camera 310 may include one or more additional components, such as the autofocus portion 312 depicted in FIG. 2.

Turning to FIG. 5A, the lens 313 is oriented to cross the line of sight 111 of the image capture element 311 within the camera 310 at the center of the lens 313 with angles of incidence that are perpendicular to the line of sight 111 at both transitions between the material of the lens and the ambient air. As a result, a beam of light following the line of sight 111 is not refracted in a manner that causes pivoting of the line of sight, and thus, such a beam of light continues in the same direction after passing through the lens. However, and turning to FIG. 5B, when the lens 313 is moved a relatively small distance in a direction perpendicular to the portion of the line of sight 111 that extends between the camera 310 and the lens 313, that portion of the line of sight 111 is caused to meet the lens with an angle of incidence that is not perpendicular to that portion of the line of sight 111. This results in bending of the line of sight 111 within the lens 313 such that the portion of the line of sight 111 that extends from the opposite side of the lens 313 is pivoted away from the direction followed by the portion of the line of sight 111 that extends between the camera 310 and the lens 313. Thus, a beam of light following one of the portions of the line of sight 111 is refracted by the two transitions between the material of the lens and the ambient air such that its path is changed to follow the different path of the other portion of the line of sight upon emerging from the lens 313. Returning to FIG. 4, this use of refraction and movement of the lens 313 enables a portion of the line of sight 111 to be pivoted horizontally to an angle to the left (following the curving "L" arrow) or to the right (following the curving "R" arrow), and/or vertically to a higher angle of elevation (following the curving "U" arrow "upwards") or a lower angle of elevation (following the curving "D" arrow "downwards"). Thus, despite the differences in what is mechanically moved by the multiple MSM actuators 370 in embodiments of the capture device 300 FIG. 3 versus FIG. 4, the result of enabling the line of sight 111 to be pivoted in a range of directions in two different dimensions is quite similar.

Returning to FIGS. 1 and 2, the control routine 340 incorporates a sequence of instructions operative on the processor component 350 in its role as a main processor component of the capture device 300 to implement logic to perform various functions. In executing the control routine 340, the processor component 350 may operate at least the image capture element 311 of the camera 310 to capture images, and may store digital data representing the captured images as the image data 331 in the storage 360. The images so captured may be individual still images or may be a sequence of images captured at a regular interval of time to form motion video. Regardless of the type of images captured, the processor component 350 may further operate the interface 390 to transmit at least a portion of the image data 331 to the remote device 600 via the network 999.

In embodiments that include one or both of the controls 320 and/or the display 380, the processor component 350 may monitor the controls 320 and/or operate the display 380 to provide a user interface by which an operator of the capture device 300 may control the capturing of images and/or the exchanging of at least portions of the image data 331 with the remote device 600. By way of example, the controls 320 may include manually operable switches, buttons, knobs, a touchpad, etc. by which an operator of the capture device 300 may control various aspects of the capture of an image (e.g., light level, focal settings, use of a timer, frame rate, etc.). By way of another example, the processor component 350 may operate the display 380 to visually present menus of settings for various aspects of capturing an image and/or exchanging at least a portion of the image data 331, and may monitor the controls 320 for indications of manual operation thereof to navigate the menus and/or select one or more menu items presented in the menus.

Figure 6:
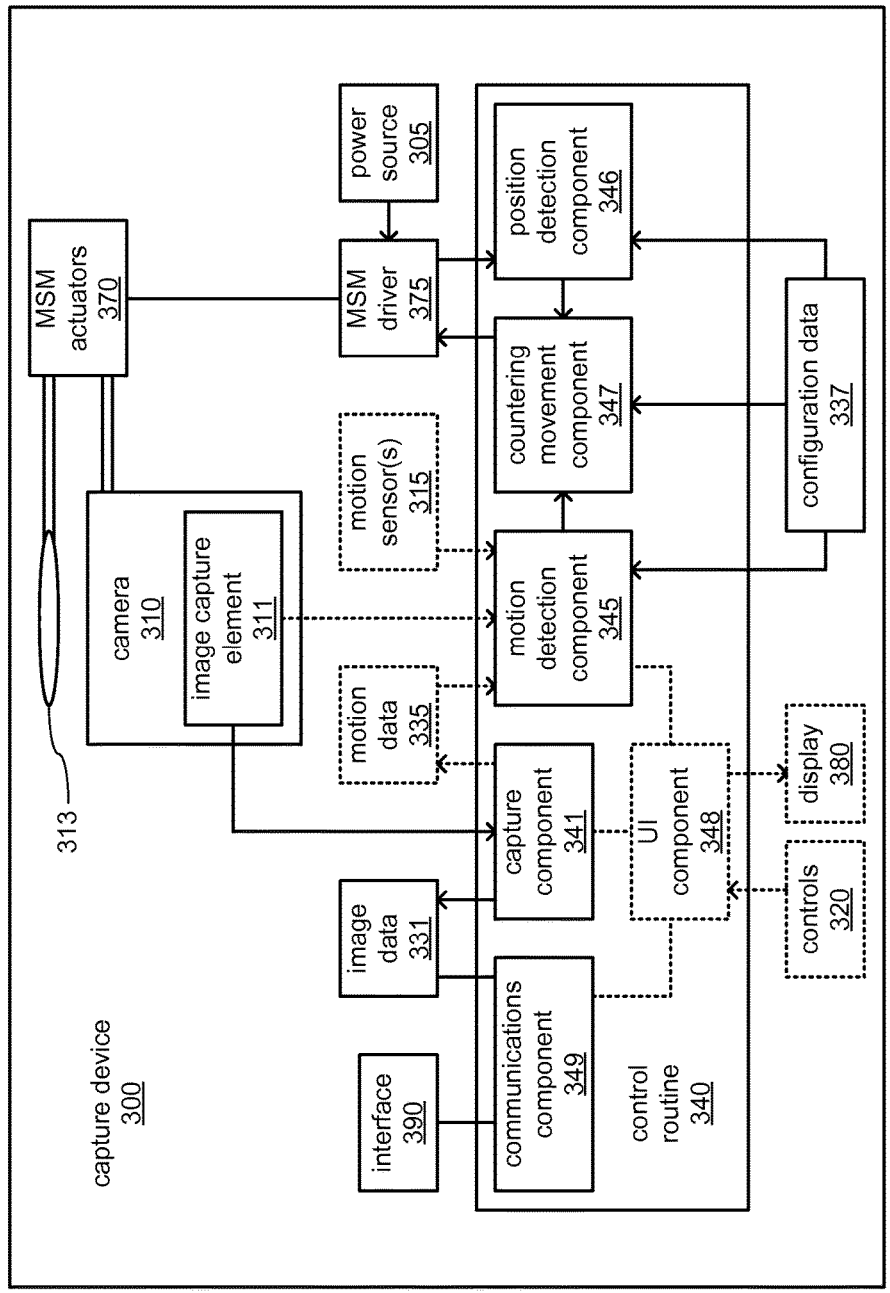
FIG. 6 illustrates an example portion of a capture device according to an embodiment.

Regardless of whether the images captured are still images and regardless of the manner in which the capture device 300 is operated, as previously discussed, unsteadiness in physically supporting the capture device 300 during the capturing of images can degrade the quality of the images captured. Such unsteadiness can cause relatively small movements of the capture device 300 in various directions that can cause blurring in individual captured images and/or an undesirable visible shakiness in captured motion video. To address this, the processor component 350 may operate the multiple MSM actuators 370 to provide OIS. FIG. 6 depicts an example embodiment of such provision of OIS through operation of the multiple MSM actuators 370 in response to detecting relatively small movements that may be deemed consistent with unsteadiness in physically supporting the capture device 300. As depicted, the control routine 340 may incorporate one or more of a capture component 341, a motion detection component 345, a position detection component 346, a countering movement component 347, a user interface (UI) component 348 and a communications component 349. In executing the control routine 340, the processor component 350 may execute one or more of the components 341, 345, 346, 347, 348 and 349.

The image capture component 341 may operate at least the image capture element 311 of the camera 310 to capture images. The image capture element 311 may be any of a variety of types of device to capture images, including and not limited to a charge-coupled device (CCD). The image capture element 311 may employ one or more two-dimensional grids of light-sensitive elements to capture images such that each image may be made up of pixels organized into a two-dimensional grid. Again, the image capture element 311 may be operated to capture individual still images and/or may be operated to capture a series of images at a recurring interval of time to form a motion video.

The motion detection component 345 may operate at least the image capture element 311 of the camera 310 and/or may operate the motion sensor(s) 315 to detect motion of the capture device 300 that may be deemed to arise from unsteady physical support of the capture device 300. More specifically, in some embodiments, the motion detection component 345 may cooperate with the capture component 341 to capture a series of images for use in detecting motion. Where the capture component 341 is already engaged in capturing a series of images as part of capturing motion video, copies of those same captured images may be stored as the motion data 335 for use by the motion detection component 345. However, where the capturing component 341 is not already engaged in capturing a series of images, the motion detection component 345 may cooperate with the capture component 341 to cause the capturing of a series of images specifically for use by the motion detection component 345 as the motion data 335. Regardless of what triggers the capture component 341 to capture a series of images making up the motion data 335, the motion detection component 345 may compare multiple ones of the images in that series of captured images to determine whether there are occurrences of relatively small movements that may be deemed to arise from unsteady physical supporting of the capture device 300 during capture of those images.

Alternatively or additionally, in embodiments in which the capture device 300 incorporates one or more motion sensors 315, the motion detection component 345 may monitor the motion sensor(s) 315 for indications of detection of relatively small movements that may be deemed to arise from unsteady physical supporting of the capture device. The motion detection component 345 may perform such monitoring of the motion sensor(s) 315 at least during times when the capture component 341 is engaged in operating at least the image capture element 311 to capture images. The one or more motion sensors 315 may be any of a variety of types of motion sensing device based on any of a variety of technologies. By way of example, the motion sensor(s) 315 may include one or more accelerometers and/or gyroscopes to detect linear accelerations, detect a change in the direction of the force of gravity and/or detect rotational movement. Alternatively or additionally, one or more of the motion sensor(s) 315 may be based on microelectromechanical systems (MEMS) technology.

Regardless of whether one or both of the motion sensor(s) 315 or the capturing of images is employed to detect motion, the motion detection component 345 may analyze the detected motion to determine whether the detected motion includes relatively small movements that may be deemed to arise from unsteadiness in physically supporting the capture device 300, at least during use of the camera 310 to capture images. In performing such an analysis, the motion detection component 345 may retrieve indications of one or more parameters of motion from the configuration data 337 to use in determining whether the detected motion includes such relatively small movements. Such parameters as may be indicated in the configuration data 337 may include indications of a minimum magnitude, a maximum magnitude and/or ranges of magnitudes of acceleration, degree of change in direction of acceleration, intervals of time between occurrences of acceleration and/or changes in acceleration, etc. As previously discussed, it may be deemed desirable to distinguish motion arising from unsteady supporting of the capture device 300 from motion arising from a deliberate moving of the capture device 300 to effect a visible movement in the captured images, such as panning Upon determining that the detected motion arises from unsteady physical supporting of the capture device 300, the motion detection component 345 may signal the countering movement component 347 with indications of one or more aspects of such motion (e.g., indications of direction and/or magnitude of acceleration of relatively small movements determined to arise from such unsteady support).

The countering movement component 347 may employ such indications received from the motion detection component 345 of motion determined to arise from unsteady physical support of the capture device 300 in deriving one or more countering movements as part of providing OIS. Again, in different embodiments, providing OIS may entail operation of multiple MSM actuators 370 to move the camera 310 and/or the lens 313. Upon deriving one or more countering movements, the countering movement component 347 may select one or more of the MSM actuators 370 to use to effect those countering movements. In so doing, the countering movement component 347 may employ indications from the configuration data 337 of the geometry and/or other aspects of the manner in which the multiple MSM actuators 370 are mechanically coupled to each other and/or coupled to the camera 310 and/or the lens 313 from the configuration data 337. The countering movement component 347 may then operate the MSM driver 375 to drive electric power to the selected one or more of the MSM actuators 370 to generate magnetic field(s) to cause the countering movements. As previously discussed, each of the MSM actuators 370 may incorporate a piece of material that is responsive at a molecular level to the presence of a magnetic field to change shape and/or at least one dimension in a manner that may be harnessed to provide mechanical movement.

FIGS. 7A and 7B, together, depict an example of such operation of one of the MSM actuators 370 through the MSM driver 375 to effect a countering movement. As depicted an example of one of the MSM actuators 370 may include one or more coils 371 to generate a magnetic field and at least one piece of magnetically-responsive material 372 to respond to that magnetic field by changing a shape and/or at least one dimension. As familiar to those skilled in the art of MSM actuators, the magnetically-responsive material 372 may be made up of a variety of alloys and/or other materials in which at least a subset of the molecules are oriented to cooperate to provide a selected and/or configured mechanical response (e.g., a selected or configured change in shape and/or change in at least one dimension) when exposed to a magnetic field. As also depicted, the MSM driver 375 may incorporate a driver component 377 to drive the one or more coils 371 with electric power to cause the one or more coils 371 to generate a magnetic field.

Turning to FIG. 7A, the depicted example one of the MSM actuators 370 may be of a type in which the magnetically-responsive material 372 is of a generally elongate shape that may respond to the presence of a magnetic field by becoming longer. Thus, FIG. 7A may depict the physical configuration of the magnetically-responsive material 372 before a magnetic field is applied via the coil(s) 371, and FIG. 7B may depict the physical configuration of the magnetically-responsive material 372 either during or after application of such a magnetic field. Indeed, the elongate shape of the magnetically-responsive material 372 may be intended to enhance such a linear mechanical response to increase the distance by which the magnetically-responsive material 372 lengthens along its lengthwise dimension. As recognizable to those skilled in the art, such a response by the magnetically-responsive material 372 may be used to exert force against another object. However, it should be noted that other embodiments are possible in which the magnetically-responsive material 372 may shorten along such a lengthwise dimension, instead of lengthen. Thus, in such other embodiments, FIG. 7B may depict the physical configuration of the magnetically-responsive material 372 before a magnetic field is applied via the coil(s) 371, and FIG. 7A may depict the physical configuration of the magnetically-responsive material 372 either during or after application of such a magnetic field.

As familiar to those skilled in the art of MSM actuators, the extent of change in shape and/or change in a dimension by the magnetically-responsive material 372 in response to a magnetic field may be controllable by controlling at least the strength and/or the duration of the magnetic field applied to the magnetically-responsive material 372. Thus, where it is desired to cause the magnetically-responsive material 372 to only partly change shape and/or partly change in at least one dimension, the coil(s) 371 may be operated to generate a magnetic field of a lesser strength and/or for a shorter duration than may be otherwise be generated to achieve a more complete change in shape and/or in the at least one dimension. Thus, the countering movement component 347 may vary the extent of movement of the camera 310 and/or of the lens 313 by varying the amount of electric power applied to the coil(s) 371 to vary the strength of an applied magnetic field and/or by varying the duration of application of electric power to the coil(s) 371 to vary the duration of the applied magnetic field.

As also familiar to those skilled in the art of MSM actuators, the mechanical response of the magnetically-responsive material 372 may not be reversible by withdrawing the magnetic field that caused the mechanical response, and/or by reversing a flow of electric current through the one or more coils to generate another magnetic field with reversed poles from the magnetic field that caused the mechanical response. Stated differently, the magnetically-responsive material 372 may not have the characteristic of reverting to a shape and/or dimension(s) it had prior to the application of a magnetic field, and/or it may not be possible to cause such a reversion by applying a magnetic field of an opposite polarity. Instead, it may be necessary to employ another component to apply force to the magnetically-responsive material 372, at least at a time when the coil(s) 371 are not operated to generate a magnetic field, to reverse the mechanical response of the magnetically-responsive material 372 to a magnetic field from the coil(s) 371.

Thus, once the magnetically-responsive material 372 has responded to a magnetic field by making its change in shape and/or in one or more dimensions, the magnetically-responsive material 372 may maintain its changed shape and/or changed dimension(s) after a magnetic field is no longer applied, and an external force may need to be applied to cause the magnetically-responsive material 372 to go back to the shape and/or dimension(s) it had before that magnetic field was applied. This characteristic of the magnetically-responsive material 372 may make the use of one or more MSM actuators 370 desirable in implementing OIS, since after electric power is applied to cause the MSM actuator(s) 370 to move the camera 310 and/or the lens 313 to a new position, the MSM actuator(s) 370 may continue to hold the camera 310 and/or the lens 313 in that new position even after electric power is no longer applied. This may conserve a considerable amount of electric power over other types of actuators that must be continuously provided with electric power to hold an object in a particular position.

To enable the multiple MSM actuators 370 to so maintain the camera 310 and/or the lens 313 at a position to which one or both have been moved by one or more of the MSM actuators 370, the MSM actuators 370 may need to be chosen to require a sufficiently high magnitude of force to reverse their mechanical responses to the application of a magnetic field so that at least the mere weight of the camera 310 and/or of the lens 313 is not enough to exert that magnitude. However, as recognizable to those skilled in the art, increasing that required magnitude tends to entail increasing the physical size and/or power consumption of the MSM actuators 370 used. Correspondingly, where one of the MSM actuators 370 is employed to exert force in opposition to the another of the MSM actuators 370 to reverse a change in shape and/or dimensions of the magnetically-responsive material 372 caused by a magnetic field, the one of the MSM actuators 370 that exerts that opposing force may also need to be increased in size and/or in the amount of electric power it consumes.

Returning to FIG. 6, the position detection component 346 may operate the MSM driver 375 to employ electrical measurements of voltage, current flow, resistance, capacitance and/or inductance to determine the current state of each of the MSM actuators 370 in order to determine the current position of the camera 310 and/or of the lens 313. Referring again to FIGS. 7A and 7B, as the magnetically-responsive material 372 is caused to change shape and/or one or more dimensions by application of a magnetic field, the resulting change in shape and/or position of the magnetically-responsive material 372 may change one or more electrical characteristics of the one or more coils 371. As depicted, the MSM driver 375 may incorporate a sensor component 376 that may be coupled to the very same conductors that are used to drive electric power to the one or more coils 371, and may be able to thereby detect the changes in electrical characteristics of the one or more coils 371.

In some embodiments, the sensor component 376 may measure electrical characteristics as the driver component 377 is operated to drive electric power to the one or more coils 371. More specifically, as the driver component 377 drives electric power to the one or more coils 371, the sensor component 376 may measure the resulting voltage and current flow, and/or may measure one or more of the inductance, capacitance or resistance of the one or more coils 371. In other embodiments, the sensor component 376 may measure electrical characteristics at times when the driver component 377 is not operated to drive electric power to the one or more coils 371. More specifically, the sensor component 376 may itself cause a flow of current through the one or more coils 371, and while doing so, may measure the resulting voltage and current flow, and/or may measure one or more of the inductance, capacitance or resistance of the one or more coils 371. The sensor component 376 may provide indications of the values measured to the position detection component 346.

Returning to FIG. 6, the values of such measurements taken by the sensor component 376, either as the one or more coils 371 are driven or not, may vary with the degree to which the magnetically-responsive material 372 changes shape and/or changes one or more of its dimensions such that the degree of such change may be determined by correlating values of one or more of such measurements to different degrees of such change. Upon using such correlations to determine the current degrees of change in shape and/or of one or more dimensions of the magnetically responsive material 372 within each of the MSM actuators 370, the position detection component 346 may employ the degrees of such change in the magnetically-responsive material 372 to determine the current pivotal orientation of the camera 310 and/or the current position of the lens 313. More precisely, the position detection component 346 may correlate the degrees of change in the magnetically-responsive material 372 within each of the MSM actuators 370 to different pivot angle(s) of the camera 310 and/or different positions of the lens 313. The position detection component 346 may retrieve indications of these various correlations from the configuration data 337. The position detection component 346 may then signal the countering movement component 347 with indications of the current position of the camera 310 (e.g., its current pivotal angles) and/or the current position of the lens 313.

The countering movement component 347 may employ such indications received from the position detection component 346 of the current position of the camera 310 and/or the lens 313 in deriving the degree to which the selected one(s) of the MSM actuators 370 are to be driven to effect a derived countering movement. More specifically, if the camera 310 and/or the lens 313 has already been moved to some degree in a particular direction, then there may be a relatively limited degree of movement in that same direction still possible before a physical limit to movement in that direction is reached. In response to such limitations, the countering movement component 347 may reduce the degree to which the selected one(s) of the MSM actuator 370 may be driven with electric power to cause further movement in that direction to either avoid encountering that limit or to reduce the speed of movement in that direction towards that limit Indeed, the countering movement component 347 may condition the performance of a countering movement on such indications received from the position detection component 346 of the current position of the camera 310 and/or the lens 313. The countering movement component 347 may retrieve indications of such limits in the degree of physical movement possible in one or more directions from the configuration data 337.

To minimize instances in which a countering movement must be limited or not implemented at all as a result of the camera 310 and/or the lens 313 having already been moved close to a limit of a particular direction of movement, the countering movement component 347 may respond to instances in which there is a relative lack of need for countering movements by moving the camera 310 and/or the lens 313 towards a center position. More specifically, where a predetermined minimum period of time has passed without a need to effect a countering movement, the countering movement component 347 may employ one or more of the MSM actuators 370 to pivot the camera 310 and/or move the lens 313 to a center position. Such a center position may be the position in which the line of sight 111 of the image capture element 311 is pivoted to an angle that is at least substantially close to the center of the range of possible pivot angles. The countering movement component 347 may operate the one or more MSM actuators 370 in a manner that causes this movement towards the center position to be made slowly so as to not introduce degradation to the quality of captured images by actually introducing the kind motion that OIS is implemented to counter.

The communications component 349 may operate the interface 390 to transmit and receive signals via the network 999 as has been described. Among the signals transmitted and/or received may be signals conveying the image data 331 to the remote device 600 via the network 999. As will be recognized by those skilled in the art, the communications component 349 is selected to be operable with whatever type of interface technology is selected to implement the interface 390.

The UI component 348 (if present) may monitor the controls 320 for an indication of operation of the controls 320 (if present) to convey indications of selection and/or specification of various aspects of the capturing of images. Among such aspects may be an indication of whether or not to use the OIS functionality just described. In so doing, the UI component 348 may operate the display 380 (if present) to visually present menus with one or more menu items that may be selected by a user through such operation of the controls 320.

In various embodiments, the processor component 350 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, the storage 360 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 390 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8B:
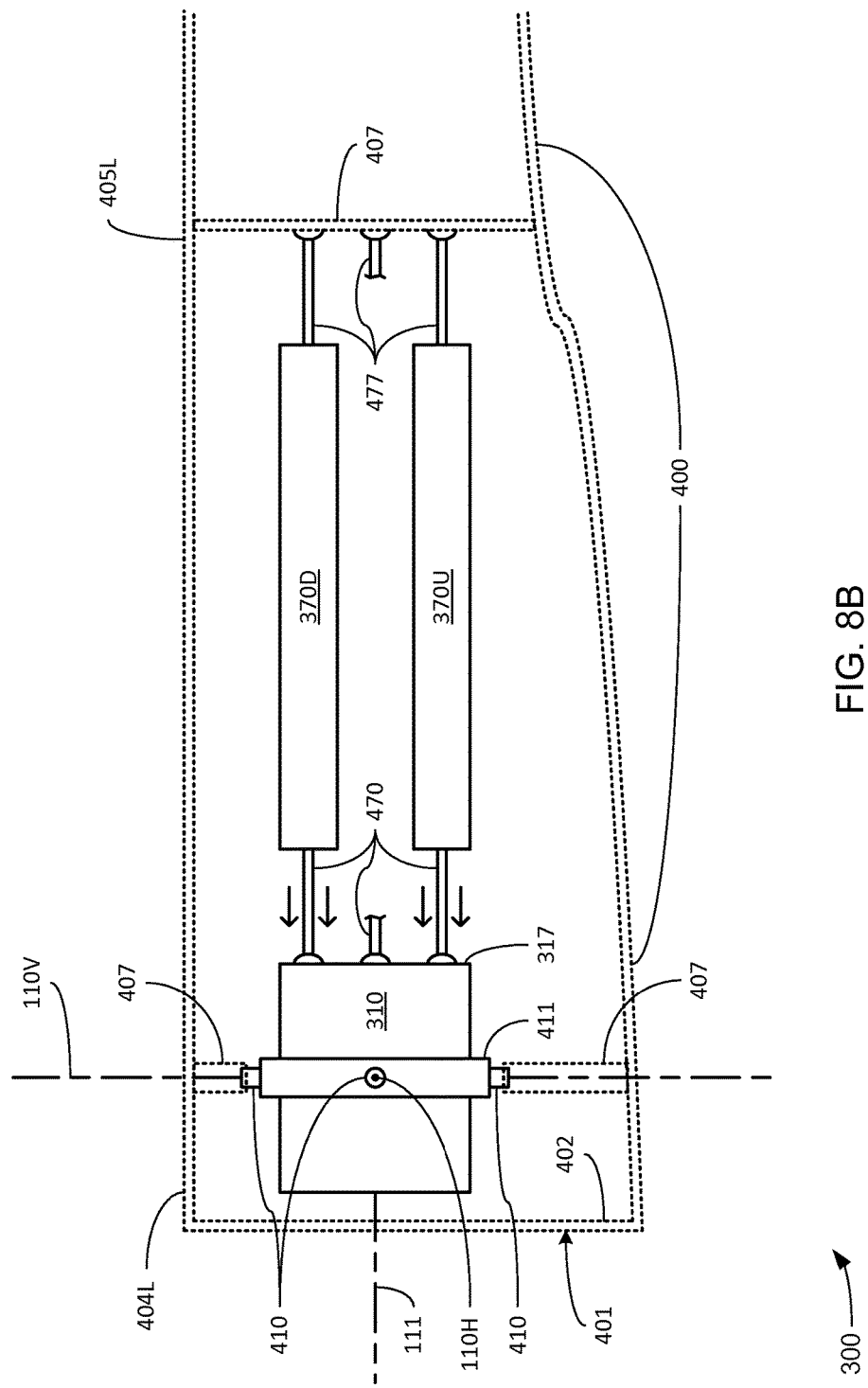

FIGS. 8A and 8B, together, depict an example embodiment of a physical configuration of the camera 310 within the front endpiece 404L and of the multiple MSM actuators 370 within the elongate portion of the left temple 405L of the capture device 300 of FIGS. 3A-B in greater detail. FIG. 8B depicts more of the structure of casing 400 that forms the left temple 405L than does FIG. 8A. Referring to both FIGS. 8A and 8B, the camera 310 is again depicted as positioned within the front endpiece 404L of the left temple 405L with the line of sight 111 extending from the image capture element 311 within the camera 310 and outward therefrom through the sheet-like portion 402 of the front endpiece 404L. Thus, again, the line of sight 111 passes through the front surface 401 that is at least partly defined by the sheet-like portion 402, and again, the sheet-like portion 402 may be transparent or an aperture (not shown) may be formed therethrough at least at the location thereof through which the line of sight 111 passes. As also depicted, the multiple MSM actuators 370 may be positioned within the left temple 405L adjacent a rear portion 317 of the camera 310 such that their elongate shapes extend therefrom and towards the earpiece 406L within the interior of the elongate portion of the left temple 405L that extends between the front endpiece 404L and the earpiece 406L.

As depicted, the camera 310 is mounted within an interior of a gimbal ring 411 by a pair of pins 410, and the gimbal ring 411 is in turn mounted to a supporting portion 407 of the interior of the front endpiece 404L by another pair of the pins 410. As depicted, the locations of the pins 410 may coincide with the two axes 110H and 110V to enable the camera 310 to rotate there these two axes. It should be noted that although the use of relatively simple cylindrical pins 410 is depicted to provide such pivotal mounting, other embodiments are possible in which other forms of pivotal mounting may be used in place of at least the pins 410, such as ball or sleeve bearings, etc.

As also depicted, each of the multiple MSM actuators 370 (specifically, the MSM actuators 370D, 370L, 370R and 370U) may be mechanically coupled to the camera 310 (e.g., the rear portion 317 of the camera 310) via a separate linkage 470. Since the camera 310 is mounted so as to enable pivoting about two axes, each of the linkages 470 may be coupled to the rear portion 317 of the camera 310 in a manner that also enables pivoting about two axes, such as a ball-socket-joint or other form of universal joint. Each of the MSM actuators 370 may each also be mounted to another supporting portion 407 of the interior of the casing 400 that defines the portion of the left temple 405L that extends between the front endpiece 404L and the earpiece 406L by a separate linkage 477. Again, given the pivoting of the camera 310, each of the linkages 477 may be coupled to that supporting portion 407 of the interior of the casing 400 by another universal joint of any of a variety of types.

In embodiments in which the provision of electric power to each of the MSM actuators 370D, 370L, 370R and 370U results in an exertion of mechanical force that presses against a portion of the camera 310, the depicted relative positions of each of these MSM actuators enable a pivoting movement of the camera 310 (and accordingly, of the line of sight 111) in either angular direction about each of the axes 110H and 110V to be effected by the provision of electric power to only one of these four MSM actuators. More specifically, and presuming that the capture device 300 is worn on the head of a user in a manner in which the axis 110H is oriented horizontally to extend left-to-right from the perspective of the user, a downward pivoting of the line of sight 111 (following the curving arrow marked "D") may be effected by providing electric power to the MSM actuator 370D to cause the MSM actuator 370D to press against the rear portion 317 via its associated linkage 470 to cause the camera 310 to pivot about the about the axis 110H. Correspondingly, an upward pivoting of the line of sight 111 (following the curving arrow marked "U") may be effected by providing electric power to the MSM actuator 370U to cause the MSM actuator 370U to press against the rear portion 317 via its associated linkage 470 to cause the camera 310 to pivot the other way about the axis 110H. Further, and presuming that the axis 110v is oriented vertically, a leftward pivoting of the line of sight 111 (following the curving arrow marked "L") may be effected by providing electric power to the MSM actuator 370L to cause the MSM actuator 370L to press against the rear portion 317 via its associated linkage 470 to cause the camera 310 to pivot in one direction about the axis 110V. Correspondingly, a rightward pivoting of the line of sight 111 (following the curving arrow marked "R") may be effected by providing electric power to the MSM actuator 370R to cause the MSM actuator 370R to press against the rear portion 317 via its associated linkage 470 to cause the camera 310 to pivot in the other direction about the axis 110V.

Turning to FIG. 8B, the MSM actuators 370L and 370R have been omitted to allow the manner in which the MSM actuators 370U and 370D indirectly exert mechanical forces against each other through the camera 310 to be more readily appreciated. Stated differently, in embodiments in which each of the MSM actuators 370 elongate to exert force against the rear portion 317 of the camera 310, the fact that the camera 310 is mounted to pivot about the axis 110H results in an instance of one of the MSM actuators 370U or 370D elongating to exert force against the rear portion 317 necessarily causing compression of the other of these two actuators. By way of example, as electric power from the power source 305 is applied to the MSM actuator 370U, the magnetically-responsive material 372 of the MSM actuator 370U may elongate in at least one dimension causing the MSM actuator 370U to exert physical force against the rear portion 317 through its associated linkage 470, thereby causing the camera 310 to pivot about the axis 110H such that the line of sight 111 is pivoted upward to a higher elevation. As a result of this pivoting of the camera 310 about the axis 110H, the rear portion 317 is caused to press against the MSM actuator 370D through its associated linkage 470, thereby causing a shortening of at least one dimension of the magnetically-responsive material 372 of the MSM actuator 370D.

Figure 9A:
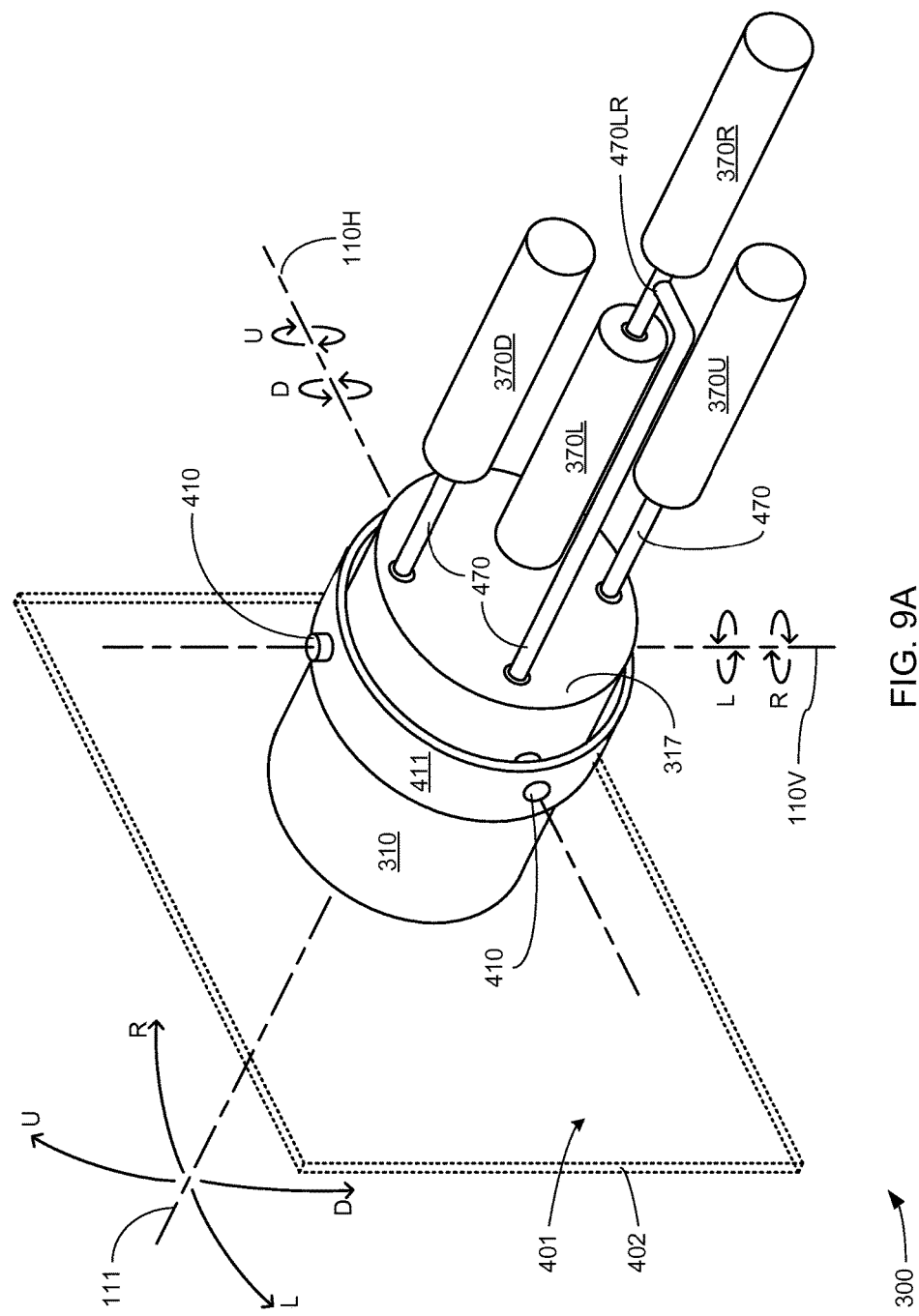
FIGS. 9A and 9B, together, illustrate another example physical configuration of actuators and other components to pivot a camera.
Figure 9B:
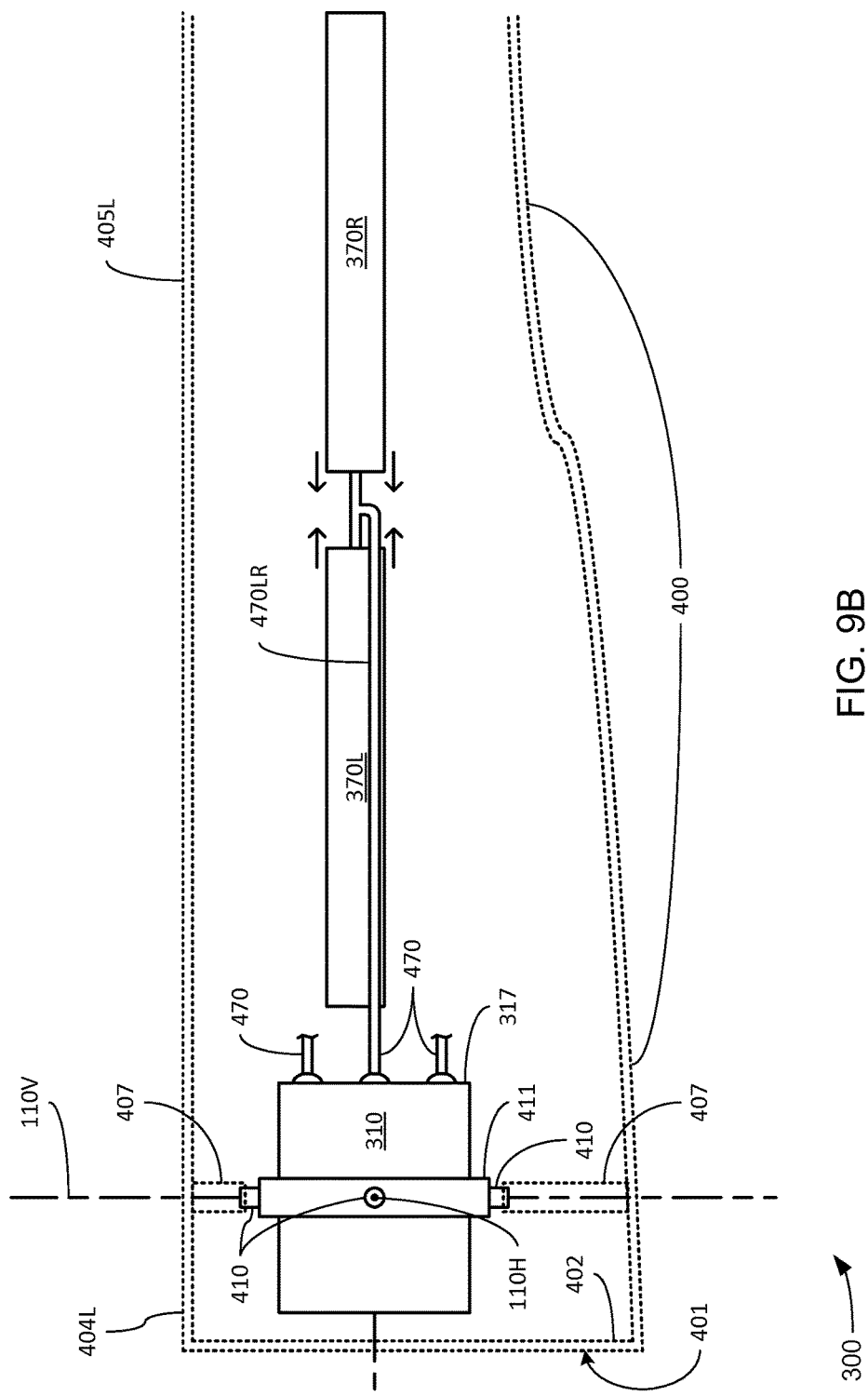

FIGS. 9A and 9B, together, depict an example embodiment of another physical configuration of the camera 310 within the front endpiece 404L and of the multiple MSM actuators 370 within the elongate portion of the left temple 405L of the capture device 300 of FIGS. 3A-B in greater detail. What is depicted in FIGS. 9A and 9B is quite similar to what is depicted in FIGS. 8A and 8B in many ways. However, the manner in which the MSM actuators 370L and 370R are coupled to and exert force on the rear portion 317 of the camera 310 in FIGS. 9A-B does differ from the manner in which they do so in FIGS. 8A-B. More precisely, while the MSM actuators 370L and 370R were each individually coupled to the camera 310 through separate linkages 470 in FIGS. 8A-B, the MSM actuators 370L and 370R are both coupled to the camera 310 through the same single linkage 470LR in FIGS. 9A-B.

Turning to FIG. 9B, the MSM actuators 370U and 370D have been omitted to allow the manner in which the MSM actuators 370L and 370R directly exert mechanical forces against each other in a push-push double actuator configuration to be more readily appreciated. Also omitted in an effort to reduce visual clutter is any depiction of the manner in which the MSM actuators 370L and 370R are coupled to the interior of the portion of the casing 400 that defines the left temple 405L. As can be seen, a portion of the linkage 470LR extends between the MSM actuators 370L and 370R to create the coupling between them, and another portion of the linkage 470LR extends from between these two actuators and towards the rear portion 317 of the camera 310. Stated differently, in embodiments in which each of the MSM actuators 370 elongate to exert force to pivot the camera 310, the fact that the MSM actuators 370L and 370R are directly coupled to exert force against each other results in an instance of one of the MSM actuators 370L or 370R elongating to pivot the camera 310 necessarily causing compression of the other of these two actuators. As one of the MSM actuators 370U and 370D elongates and thereby causes the other to shorten, the entire linkage 470LR either pushes against or pulls on the rear portion 317 at a location selected to cause pivoting of the camera 310 about the axis 110V.

Figure 10A:
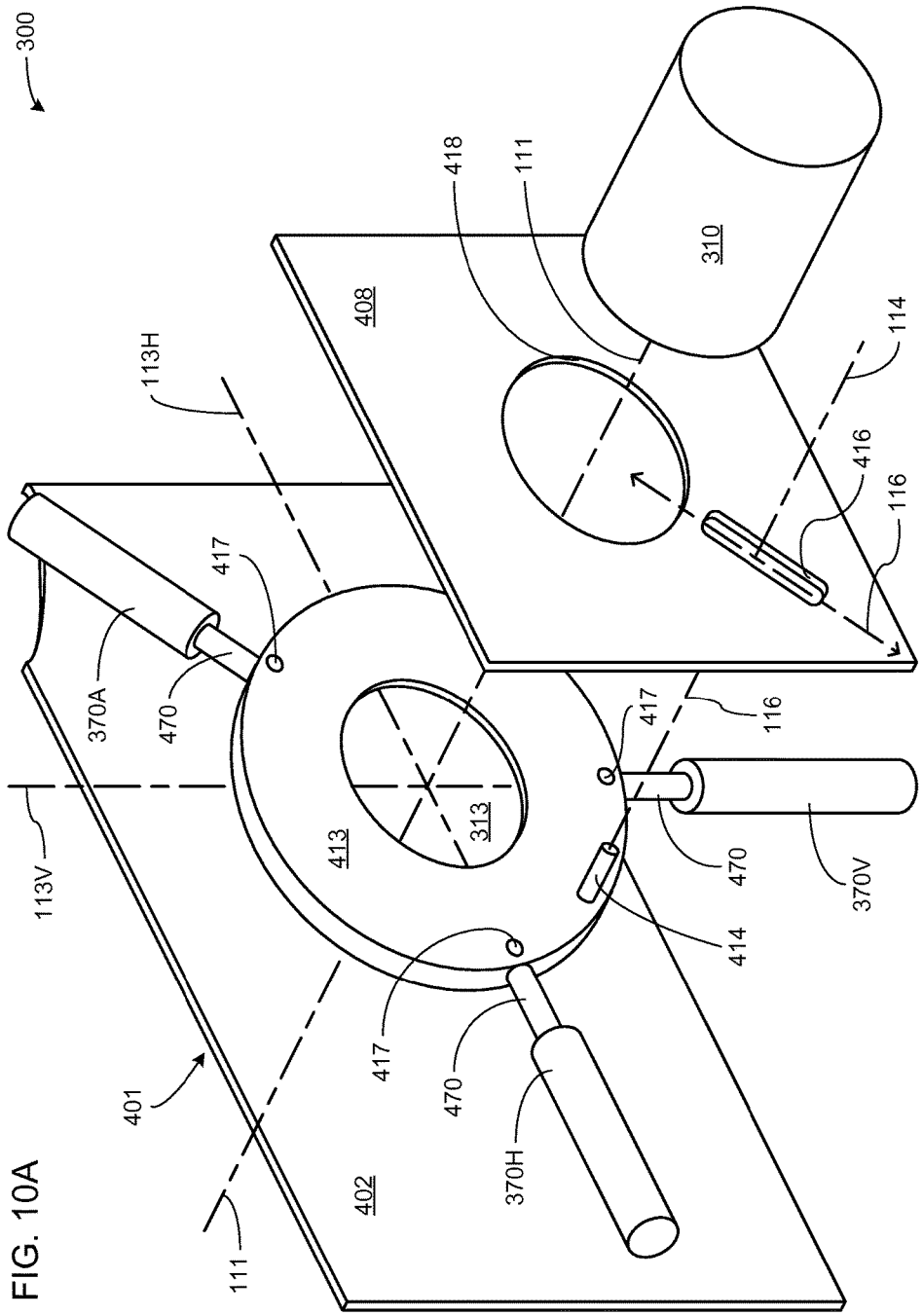

FIGS. 10A and 10B, together, depict an example embodiment of a physical configuration of the lens 313 and of the multiple MSM actuators 370 within the casing 400 of the capture device 300 of FIG. 4 in greater detail. Each of FIGS. 10A and 10B depicts different portions of the casing 400 that provide structural support of components employed in moving about the lens 313 within a plane that crosses the line of sight 111 of the image capture element 311 within the camera 310. Referring to both FIGS. 10A and 10B, the lens 313 is again depicted as positioned between a sheet-like portion 402 of the casing 400 that defines at least a portion of a front surface 401 and the camera 310. Thus, again, the line of sight 111 passes through the front surface 401 that is at least partly defined by the sheet-like portion 402, and again, the sheet-like portion 402 may be transparent or an aperture (not shown) may be formed therethrough at least at the location thereof through which the line of sight 111 passes. As also depicted, the multiple MSM actuators 370 may be positioned in orientations radiating away from the lens 313.

As depicted, the lens 313 may be placed between the sheet-like portion 402 making up a portion of the front surface 401 and another sheet-like portion 408 that may extend in parallel with the sheet-like portion 402, may be positioned between the lens 313 and the camera 310, and may cooperate with the sheet-like portion 402 to constrain movement of the lens 313 to within the plane defined by the axes 113H and 113V. As also depicted, the lens 313 may be carried within a frame 413 that may engage surfaces of the sheet-like portions 402 and 408 as part of constraining the movement of the lens 313 to within that plane. Further, the frame 413 may carry a projection 414 extending along an axis 114 to and either into or through a slot 416 that is either formed all the way through the sheet-like portion 408 (as depicted) or formed as a groove in a surface of the sheet-like portion 408 (not shown). The slot 416 may be of a generally elongate shape that may extend in a straight line that defines an axis 116 and may be just wide enough to admit at least a portion of the projection 414 therethrough or therein. The projection 414 and the slot 416 may cooperate to limit the range of movement of the lens 313 within the plane defined by the axes 113H and 113V.

While the lens 313 may be movable within the plane defined by the axes 113H and 113V relative to the interior of the casing 400, the camera 310 may be mounted within the casing 400 in a manner in which it does not move relative to casing 400. As depicted, the camera 310 may be mounted within the casing 400 at a position that causes the portion of the line of sight 111 emanating from the image capture element 311 within the camera 310 to cross the axis 116 defined by the slot 416 such that alignment of the center of the lens 313 with that portion of the line of sight 111 may also entail alignment of the center of the lens 313 along the axis 116. In some embodiments, the camera 310 may be so mounted as by being mounted to at least the sheet-like material 408. Not unlike the sheet-like portion 402, the sheet-like portion 408 may also be transparent or an aperture 418 may be formed therethrough (as depicted) at least at the location thereof through which the line of sight 111 passes. Thus, each of the sheet-like portions 402 and 408 positioned on either side of the lens 313 may be formed of transparent material and/or may have an aperture formed therethrough at least at the location through which the line of sight 111 of the image capture element 311 passes as part of enabling light emanating from an object outside the casing 400 to reach the image capture element 311 to enable an image of that object to be captured.

As also depicted, each of the multiple MSM actuators 370 (specifically, the MSM actuators 370H, 370V and 370A) may be mechanically coupled to a portion of the periphery of the frame 413 via a separate linkage 470. Since the lens 313 (as carried within the frame 413) is able to move about within the plane defined by the axes 113H and 113V (as constrained by the cooperation of the projection 414 and the slot 416), each of the linkages 470 may be coupled to the frame 413 in a manner that enables pivoting within that plane, such as the depicted pivoting joints 417. Each of the MSM actuators 370 may each also be mounted to other supporting portions 407 of the interior of the casing 400 that by a separate linkage 477, and each of those couplings of one of the linkages 477 to a supporting portion 407 may also include a pivoting joint.

It should be noted that although the lens 313 is depicted and discussed as being carried within the frame 413, other embodiments are possible in which the lens 313 is not carried within any form of frame such that the lens 313 is engaged more directly by the MSM actuators 370 (e.g., directly engaged by the linkages 470 thereof) and/or such that the lens 313 directly carries the projection 414. It should also be noted that although the frame 413 (or the lens 313) is depicted and/or discussed as carrying the projection 414 while the slot 416 is formed through or into a surface of the sheet-like portion 408, other embodiments are possible in which the sheet-like portion 408 carries the projection 414 and the slot 416 is formed through or into a surface of the frame 413 (or the lens 313).

In embodiments in which the provision of electric power to each of the MSM actuators 370H, 370V and 370A results in an exertion of mechanical force that presses against a portion of the periphery of the frame 413, the depicted relative positions of each of these MSM actuators enable movement of the lens 313 within the plane defined by the axes 113H and 113V to be effected by the provision of electric power to either one or two of these three MSM actuators. More specifically, the depicted placement of the MSM actuators 370H, 370V and 370A enable movement of the lens 313 along the axis 116 defined by the slot 416 and constrained by the limits of such movement imposed by the slot 416 on the projection 414. Such depicted placement of these actuators may also enable a pivoting movement of the lens 313 out of the axis 116 at the location of the projection 414 within the slot 416. The interaction between the slot 416 and the projection 414 enables a wide range of movement of the lens 313 within the plane defined by axes 113H and 113V, while still imposing sufficient constraints on that movement to enable the lens 313 to remain amidst the MSM actuators 370H, 370V and 370A such that movement of the lens 313 within that plane can be effectively controlled by these three actuators. Without such interaction between the slot 416 and the projection 414, more than three MSM actuators 370 may be required to effectively control movement of the lens 313 within that plane. Thus, such interaction between the slot 416 and the projection 414 enables a degree of minimization of the quantity of MSM actuators required.

As further depicted, the MSM actuator 370A may be configured and/or selected to exert force on the frame 413 in a direction that is substantially aligned with the axis 116 such that the majority of the force that MSM actuator 370A exerts on the frame 413 may be along the axis 116. In contrast, the MSM actuators 370H and 370V may be configured and/or selected to exert force on the frame 413 in directions that are substantially unaligned with the axis 116. However, the MSM actuators 370H and 370V may also be configured and/or selected to exert their forces in directions that enable the MSM actuators 370H and 370V to cooperate to exert a combined force in a direction that is substantially aligned with the axis 116, but in opposition to the force that the MSM actuator 370A is able to exert. Thus, the MSM actuators 370H and 370V may be operated together to exert a combined force along the axis 116 that opposes the force that the MSM actuator 370A is able to exert along the axis 116, thereby enabling movement of the frame 413 in either direction along the axis 116. However, the directions in which the MSM actuators 370H and 370V are selected and/or configured to exert their forces are also partly in opposition to each other in opposing directions oriented crosswise relative to the axis 116. Thus, the frame 413 may be caused to not only move along the axis 413, but to also pivot out of the axis 413 with such pivoting occurring about the location of the projection 414 along the slot 416. As depicted, the directions in which each of the MSM actuators 370H and 370V exert force may be at least substantially in parallel to the axes 113H and 113V, and the axis 116 and the direction in which the MSM actuator 370A exerts force may be at least substantially at a 45 degree angle relative to the axes 113H and 113V. However, other embodiments are possible in which other relative orientations of axes and directions of force of these MSM actuators 370 may be used. FIGS. 11A, 11B, 11C, 11D and 11E each depict an example of movement of the lens 313 that may be effected by such operation of the MSM actuators 370H, 370V and 370A in the physical configuration of FIGS. 10A-B.

Figure 11E:
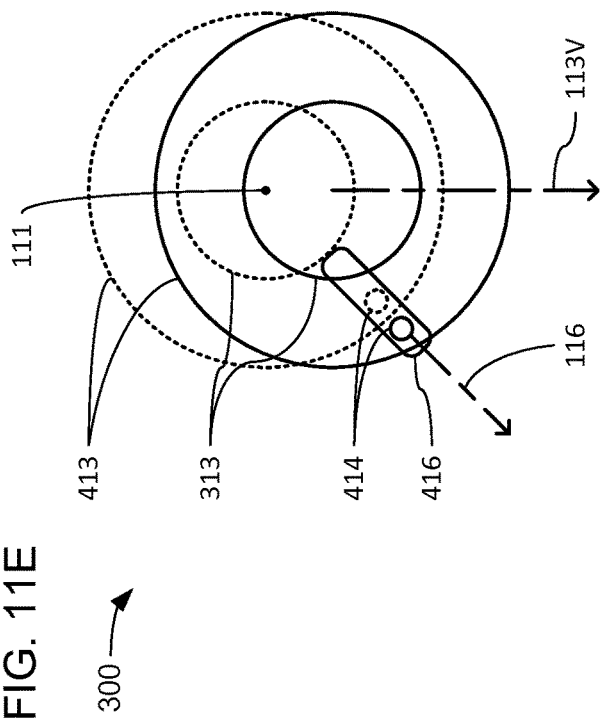

FIG. 11A depicts an example center position of the lens 313 within the range of movement that is possible in which the projection 414 is positioned at a location within the slot 416 that is well away from either end of the slot 416. Such a center position may be the position at which the center of the lens 313 is positioned along the axis 116 and is aligned with the portion of the line of sight 111 that extends between the camera 310 and the lens 313. Such a center position may be achieved by balancing the combined force exerted by the MSM actuators 370H and 370V against the force exerted by the MSM actuators 370A to position the projection 414 at a location that is at least relatively close to midway along the length of the slot 416. Balancing of the forces exerted by MSM actuators 370H and 370V may also be used position the center of the lens 313 to be at least relatively close to along the axis 116, instead of at a position pivoted away from the axis 116. For sake of reference in each of FIGS. 11B through 11E, the center position of the lens 313 and the frame 413 of FIG. 11A is depicted with dotted lines to provide a more clear presentation of the manner in which the lens 313 and the frame 413 have been moved away from that center position in each of FIGS. 11B through 11E.

FIG. 11B depicts an example movement of the lens 313 along the axis 116 in which the center of the lens 313 remains along the axis 116, but is no longer aligned with the portion of the line of sight 111 that extends between the camera 310 and the lens 313. As depicted, such movement of the lens 313 along the axis 116 necessarily entails movement along both of the axes 113H and 113V. Presuming that the slot 416 is oriented at a 45 degree angle relative to each of the axes 113H and 113V, as depicted, such movement of the lens 313 along the axis 116 as depicted in FIG. 11B may require equal exertions of mechanical force against the frame 413 by the MSM actuators 370H and 370V.

FIG. 11C depicts an example movement of the lens 313 both along and out of the axis 116 to cause the center of the lens 313 to be moved as far as possible in one direction along the axis 113V. As depicted, such movement of the center of the lens 313 in that direction along the axis 113 V necessarily includes some movement of the projection 414 along both of the axes 113H and 113V as a result of the angled orientation of the slot 416 along the axis 116 relative to each of the axes 113H and 113V. However, pivoting of the lens 313 out of the axis 116 about the location of the projection 414 within the slot 416 ultimately results in a net movement of the center of the lens only along the axis 113V such that there is no such net movement of the center of the lens 313 along the axis 113H. Given the depicted locations in FIGS. 10A-B at which each of the MSM actuators 370H and 370V are coupled to the periphery of the frame 413, some exertion of force against the frame 413 by the MSM actuator 370H may be required in addition to an exertion of force against the frame 413 by the MSM actuator 370V to achieve such a net lack of movement of the center of the lens 313 along the axis 113H. Thus, cooperation in exerting forces by the MSM actuators 370H and 370V may be required to move the lens 313 to the position depicted in FIG. 11C.

Figure 11D:
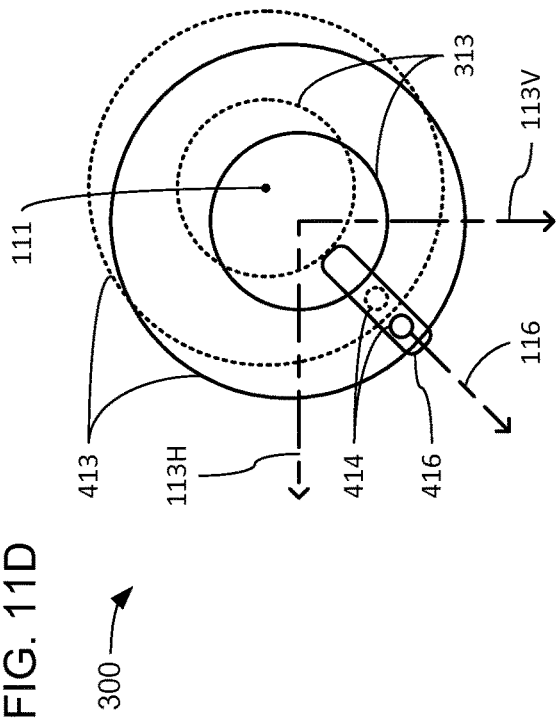

FIG. 11D depicts an example movement of the lens 313 along the axis 116 in a direction opposite to the example movement depicted in FIG. 11B. In the example movement depicted in FIG. 11D, the center of the lens 313 remains along the axis 116, but is no longer aligned with the portion of the line of sight 111 that extends between the camera 310 and the lens 313. As depicted, such movement of the lens 313 along the axis 116 necessarily entails movement along both of the axes 113H and 113V. Presuming again that the slot 416 is oriented at a 45 degree angle relative to each of the axes 113H and 113V, and that the MSM actuator 370A is at least substantially aligned with axis 116, as depicted, such movement of the lens 313 along the axis 116 as depicted in FIG. 11D may require only an exertion of mechanical force against the frame 413 by the MSM actuator 370A.

FIG. 11E depicts an example movement of the lens 313 both along and out of the axis 116 to cause the center of the lens 313 to be moved as far as possible in a direction along the axis 113V that is opposite to the direction depicted in FIG. 11C. In the example movement depicted in FIG. 11E, such movement of the center of the lens 313 in that opposite direction along the axis 113V necessarily includes some movement of the projection 414 along both of the axes 113H and 113V (in directions opposite those in which the projection 414 moved along both of the axes 113H and 113V in FIG. 11C) as a result of the angled orientation of the slot 416 along the axis 116 relative to each of the axes 113H and 113V. However, again, pivoting of the lens 313 out of the axis 116 about the location of the projection 414 within the slot 416 ultimately results in a net movement of the center of the lens only along the axis 113V such that there is no such net movement of the center of the lens 313 along the axis 113H. Given the depicted locations in FIGS. 10A-B at which each of the MSM actuators 370H and 370V are coupled to the periphery of the frame 413, some exertion of force against the frame 413 by the MSM actuator 370H may be required in addition to an exertion of force against the frame 413 by the MSM actuator 370A to achieve such a net lack of movement of the center of the lens 313 along the axis 113H. Thus, cooperation in exerting forces by the MSM actuators 370H and 370A may be required to move the lens 313 to the position depicted in FIG. 11E.

Though not specifically shown, net movements of the center of the lens 313 in either direction along the axis 113H are also possible. More broadly, the center of the lens 313 may be caused to move from the example center position of FIG. 11A to a new position in any direction from that center position through cooperative operation of any one or two of the MSM actuators 370H, 370V and 370A. Where two of these MSM actuators are used, the direction of movement may be controlled through the provision of electric power to different ones of these MSM actuators with different voltages and/or different currents, and/or through the provision of electric power to different ones of these MSM actuators for different durations.

Returning to FIGS. 10A-B, as well as also referring back to FIG. 4, presuming the plane defined by the axes 113H and 113V crosses the line of sight 111 at an angle perpendicular to the line of sight 111, such movement of the lens 313 within that plane enables pivoting of the portion of the line of sight 111 extending away from the camera 310 and beyond the lens 313 into and out of the path of the portion of the line of sight 111 that extends between the lens 313 and the camera 310 in either of two angular dimensions. Thus, through operation of the three MSM actuators 370H, 370V and 370A, the portion of the line of sight 111 extending beyond the lens 313 may be pivoted horizontally and/or vertically as part of providing OIS in the capture device 300.

By way of example, presuming that the capture device 300 is physically supported in an orientation in which the axis 113V is oriented vertically and in which the axis 113H is oriented horizontally to extend left-to-right from the perspective of the user employing the capture device 300 to capture an image, an upward pivoting of the portion of the line of sight 111 that extends beyond the lens 313 from the camera 310 (following the curving arrow marked "U" in FIG. 4) may be effected by causing a movement of the lens 313 similar to what is depicted in FIG. 11C. Again, to achieve such a movement along the axis 113V, electric power may be provided to at least the MSM actuator 370V to cause at least the MSM actuator 370V to press against the frame 413 via its associated linkage 470 to cause movement of the frame 413 upwards along the axis 113V (following the direction marked "U" along the axis 113V in FIG. 4). Further, to achieve such a net lack of movement along the axis 113H, a lesser amount of electric power may be provided to the MSM actuator 370H than to the MSM actuator 370v and/or electric power may be provided to the MSM actuator 370H for a lesser duration than provided to the MSM actuator 370V to cause a more limited exertion of force by the MSM actuator 370H against the frame 413. Thus, cooperation in exerting forces by the MSM actuators 370H and 370V may be required to move the lens 313 upwards relative to the portion of the line of sight 111 extending between the camera 310 and the lens 313 to cause pivoting of the other portion of the line of sight 111 extending beyond the lens 313 from the camera 310.

Figure 12:
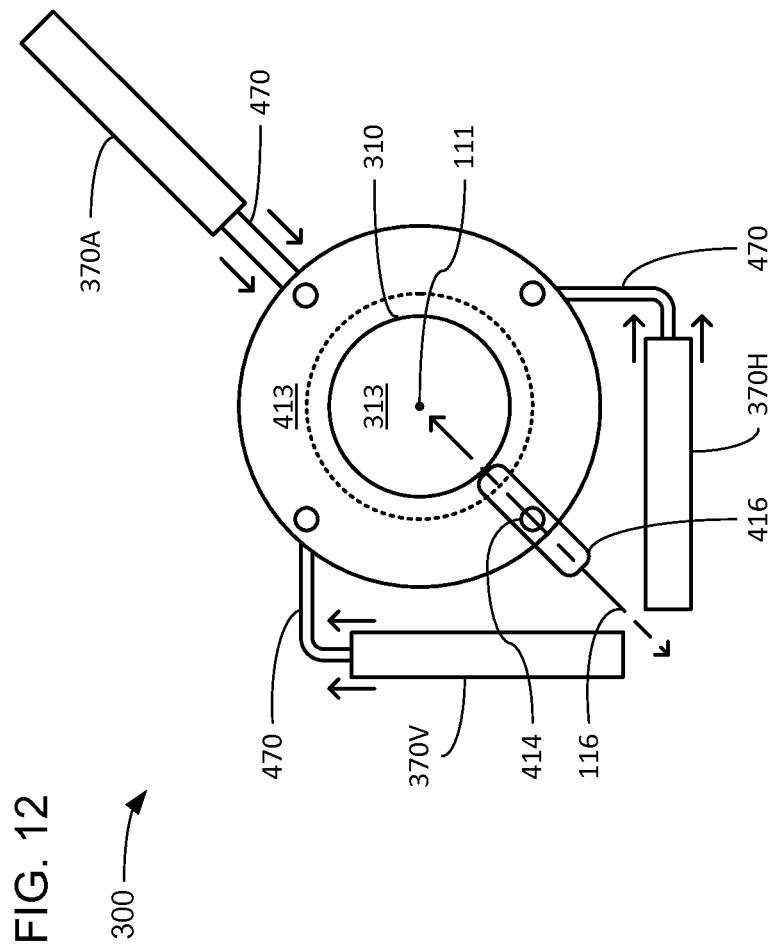
FIG. 12 illustrates another example physical configuration of actuators to move a lens.
Figure 13:
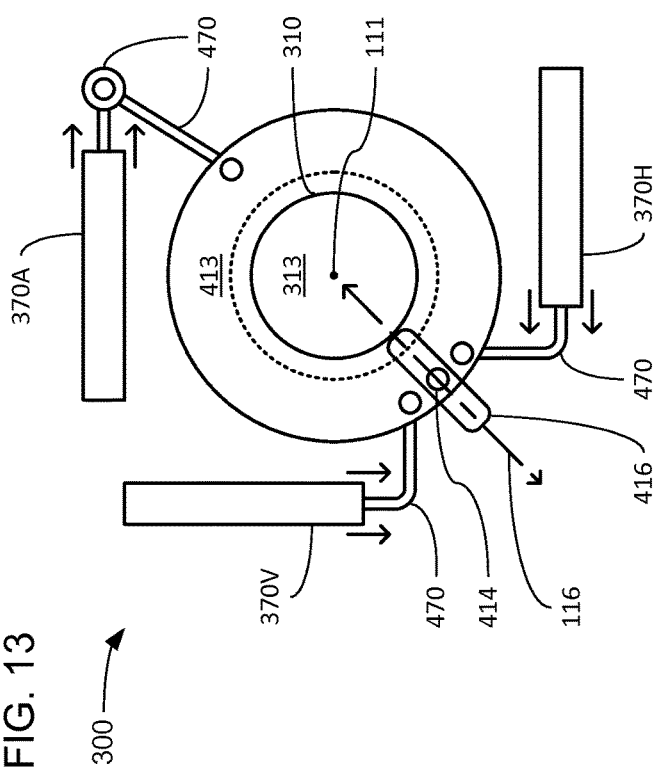
FIG. 13 illustrates still another example physical configuration of actuators to move a lens.

FIGS. 12 and 13 each depict an example embodiment of another physical configuration of the lens 313 and of the multiple MSM actuators 370 within the casing 400 of the capture device 300 of FIG. 4 in greater detail. What is depicted in each of FIGS. 12 and 13 is quite similar to what is depicted in FIGS. 10A and 10B in many ways. However, the manner in which one or more of the MSM actuators 370H, 370V and 370A are coupled to and exert force on the frame 413 in each of FIGS. 12 and 13 does differ from the manner in which they do so in FIGS. 10A-B. For the sake of visual clarity in depicting such differences, other components to which each of these three MSM actuators 370 may be coupled, including portions of the interior of the casing 400, have been omitted in each of FIGS. 12 and 13.

Turning to FIG. 12, the MSM actuators 370H and 370V are positioned differently about the periphery of the frame 413 and are coupled to the frame 413 at different locations than is depicted in FIGS. 10A-B. Instead of the MSM actuators 370H and 370V being oriented to extend away from the periphery of the frame 413 in what could be called a radiating pattern from the center of the lens 313, the MSM actuators 370H and 370V are each oriented to extend alongside different portions of the periphery of the frame 413 in FIG. 12. In this manner, the combination of the frame 413 and the three MSM actuators 370 occupy less area between the sheet-like portions 402 and 408. The MSM actuators 370H and 370V are each coupled to the frame 413 with generally "L-shaped" versions of the linkages 470 that effectively redirect the directions of the dimensionally elongating mechanical response of each of the actuators 370H and 370V into forces that pull on the frame 413, rather than press against it. These pulling forces act partially against each other and partially in combination against the pushing force able to be exerted against the frame 413 by the MSM actuator 370A.

Turning to FIG. 13, all three of the MSM actuators 370H, 370V and 370A are positioned differently about the periphery of the frame 413, and the MSM actuators 370H and 370V are coupled to the frame 413 at different locations than is depicted in FIGS. 10A-B. Instead of these three MSM actuators being oriented to extend away from the periphery of the frame 413 in what could be called a radiating pattern from the center of the lens 313, the MSM actuators 370H, 370V and 370A are each oriented to extend alongside different portions of the periphery of the frame 413 in FIG. 13. In this manner, the combination of the frame 413 and the three MSM actuators 370 occupy less area between the sheet-like portions 402 and 408. The MSM actuators 370H and 370V are each coupled to the frame 413 with generally "L-shaped" versions of linkages 470 that effectively redirect the directions of the dimensionally elongating mechanical response of each of the actuators 370H and 370V into forces that pull on the frame 413, rather than press against it. The MSM actuator 370A is coupled to the frame 413 with another version of the linkage 470 that includes a hinged "elbow" in its length and that also effectively redirects the direction of the dimensionally elongating mechanical response of the actuator 370a into a force that pulls on the frame 413, rather than presses against it. A further difference from what is depicted in FIGS. 10A-B is that the pulling force of each of these three MSM actuators 370H, 370V and 370A is exerted on the frame 413 in directions opposite to the directions of their counterpart MSM actuators in FIGS. 10A-B. Yet, the forces exerted by the MSM actuators 370H and 370V still act partially against each other and still partially in combination against the force exerted by the MSM actuator 370A.

Figure 14:
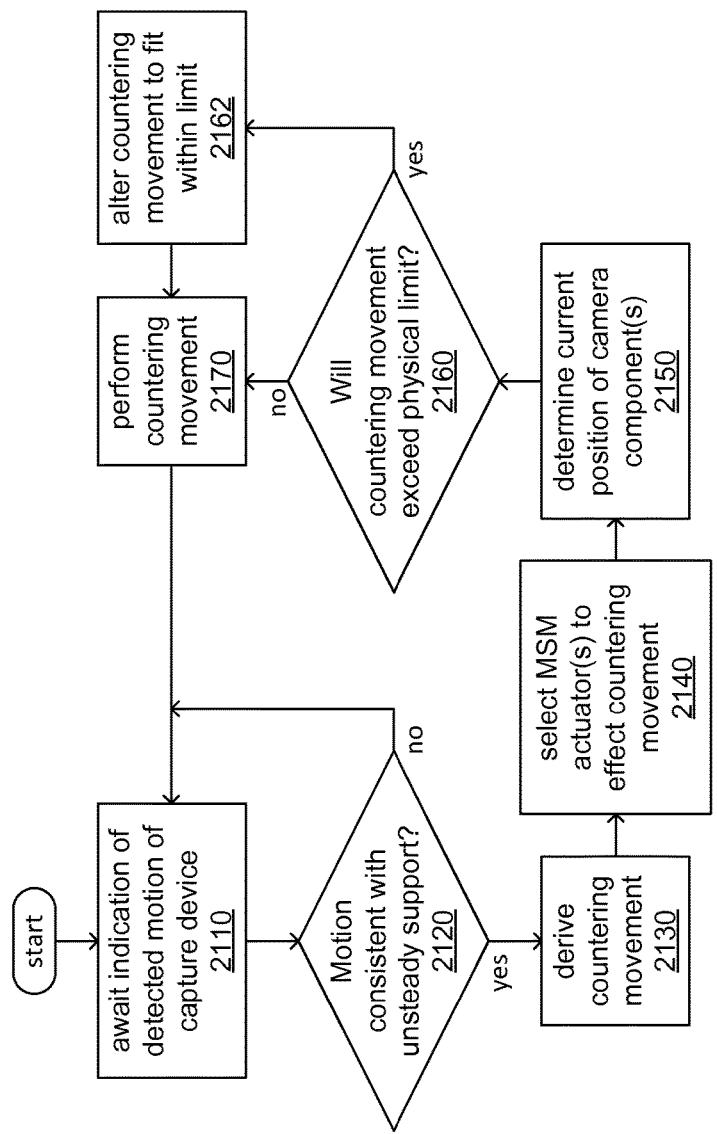
FIG. 14 illustrates a logic flow according to an embodiment.

FIG. 14 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the capture device 300.

At 2110, a processor component of a capture device to provide OIS in support of capturing images with (e.g., the processor component 350 of the capture device 300) may await an indication of motion of the capture device having been detected. As has been discussed, the detection of motion of the capture device may be accomplished by using the very same camera for which OIS is provided (e.g., the camera 310) to capture a series of images and then comparing those images to identify differences thereamong that are caused by motion of the capture device. However, as has also been discussed, detection of motion of the capture device may also be accomplished by monitoring one or more motion sensors (e.g., the motion sensors 315) for indications of detected accelerations, detected rotation of the capture device, etc.

At 2120, the processor component may analyze the detected motion to determine if the detected motion includes movement having characteristics consistent with movement caused by unsteady physical support of the capture device. As has been discussed, such unsteady physical support may arise from an operator the capture device holding the capture device in one or both hands in an unsteady manner. The movement arising from such unsteady physical support may be relatively small movements versus the relatively larger movements that would be expected to be detected if the capture device were moved deliberately during the capturing of images (e.g., a movement to cause panning of the image). In determining whether such relatively small movements are present in the detected motion, the processor component may compare characteristics of the detected motion to one or more predetermined thresholds. If the motion is determined at 2120 to not include movement having characteristic(s) consistent with movement arising from unsteady physical support of the capture device, then the processor component may return to awaiting an indication of detected motion at 2110.

However, if the motion is determined at 2120 to include movement having characteristic(s) consistent with movement arising from unsteady physical support of the capture device, the processor component may derive a countering movement to impart to a component of the camera to counter the movement arising from such unsteady physical support at 2130 to provide OIS. As has been discussed in detail, such countering movement to provide OIS may entail pivoting of at least the portion of the line of sight that extends between the capture device and the object of which the image is captured in a manner that may mimic the pivoting of the line of sight of an eyeball to counter body movement. Again, such pivoting of that portion of the line of sight may be accomplished by pivoting the entirety of the camera within the casing of the capture device and/or by moving a lens of the camera (e.g., the lens 313) within a plane that crosses the line of sight of an image capture element of the camera (e.g., the line of sight 111 of the image capture element 311) to cause pivoting of light following the line of sight through refraction.

At 2140, the processor component selects one or more MSM actuators to effect the countering movement of at least a portion of the camera. As previously discussed, the processor component may employ configuration information indicating various characteristics of each of the MSM actuators within the capture device (e.g., the multiple MSM actuators 370), including characteristics of their response to the provision of electric power to generate a magnetic field within each, direction in which each is oriented and/or exerts force, physical limits imposed by linkages and/or structural components of the casing of the capture device on range(s) of movement, etc.

At 2150, the processor component may analyze electrical characteristic(s) of one or more of the MSM actuators to determine the current location of the camera or component of the camera that is moved by the MSM actuators. As has been previously discussed, one or more electrical characteristics of coil(s) within a MSM actuator may change as a result of the shape and/or one or more of the dimensions of the magnetically-responsive material changing in response to the application of a magnetic field. The processor component may measure such electrical characteristics either during or between instances of providing electric power to a MSM actuator to generate a magnetic field, may correlate the measurement(s) to a degree of change in shape and/or in at least one dimension of the magnetically-responsive material, and may further correlate the degree of such change to the current position of the camera or camera component that is moved by that MSM actuator.

At 2160, the processor component may determine whether the countering movement derived earlier at 2130 will exceed a physical limit on a range of movement given the current position of the camera or camera component to be moved in effecting the countering movement. As has been previously discussed, the physical configuration of the MSM actuators, various linkages and/or other structural components of the capture device may impose physical limits on the range of movement possible in any particular direction. If it is determined at 2160 that effecting the countering movement will not exceed such a physical limit, then the processor component may perform the countering movement at 2170 before returning to awaiting an indication of further motion at 2110.

However, if it is determined at 2160 that effecting the countering movement will exceed such a physical limit, then the processor component 2162 may alter the countering movement at 2162 to avoid exceeding the physical limit before effecting the countering movement at 2170. As has been discussed, the extent of movement of the countering movement may be reduced to avoid encountering the physical limit However, as has also been discussed, the current position of the camera and/or the camera component to be moved in effecting the countering movement may already be sufficiently close to the physical limit that the processor component may refrain from effecting the countering movement entirely. In effect, the countering movement may be altered such that there is no movement, at all.

Figure 15:
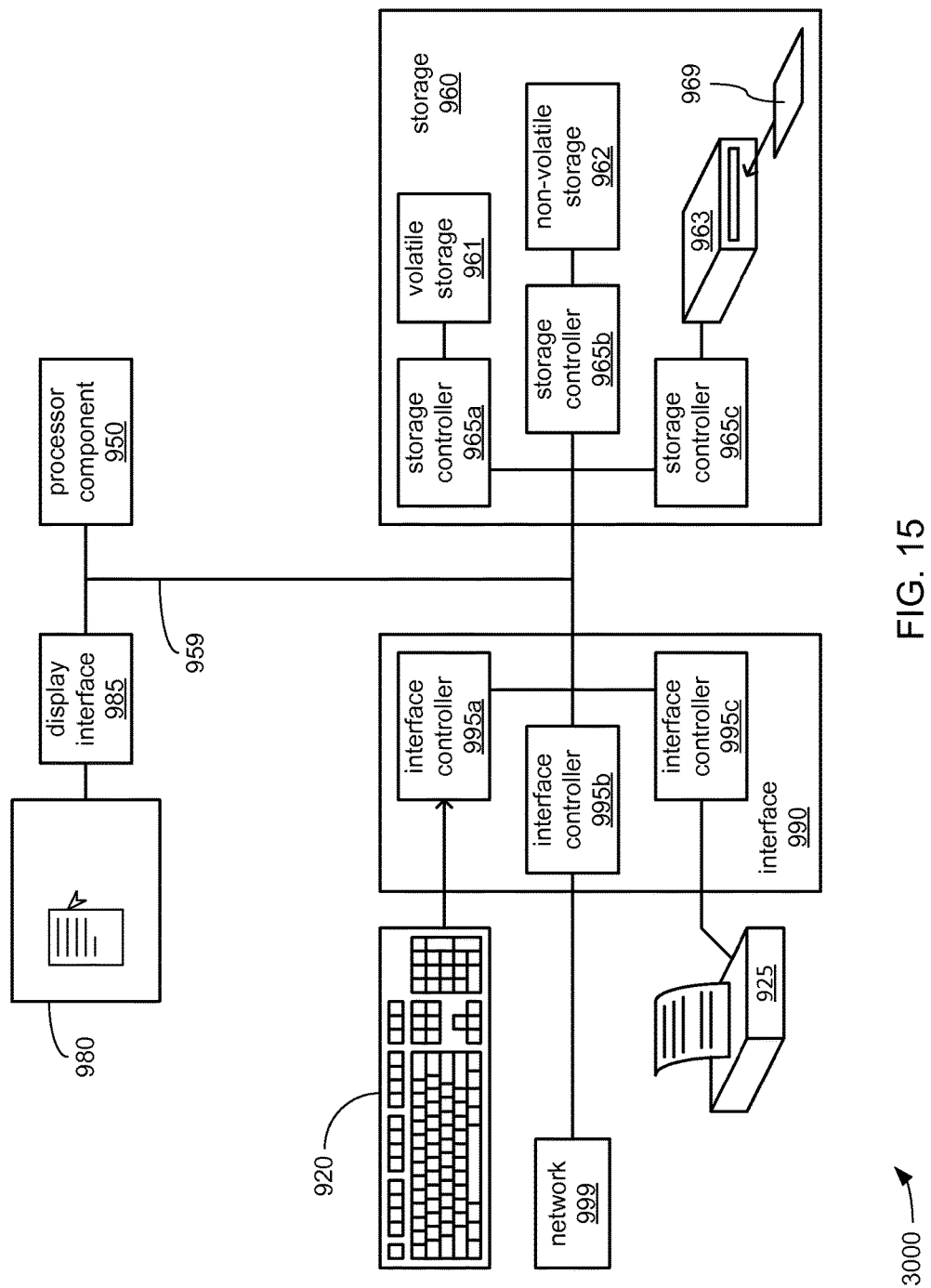
FIG. 15 illustrates a processing architecture according to an embodiment.

FIG. 15 illustrates an embodiment of an exemplary processing architecture 3000 suitable for implementing various embodiments as previously described. More specifically, the processing architecture 3000 (or variants thereof) may be implemented as part of one or more of the computing devices 300 or 600, and/or as part of the controller 600. It should be noted that components of the processing architecture 3000 are given reference numbers in which the last two digits correspond to the last two digits of reference numbers of at least some of the components earlier depicted and described as part of the computing devices 300 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to capture images includes a camera pivotally mounted within an endpiece of a casing, the camera including an image capture element to capture an image of an object along a line of sight of the image capture element; a first actuator of elongate shape coupled to the camera to exert a first mechanical force to pivot the camera about a first axis in a first direction, the elongate shape of the first actuator extending into a relatively thin and elongate portion of the casing that is coupled to and extends from the endpiece; and a countering movement component to operate the first actuator to pivot the camera in the first direction in a countering movement to provide optical image stabilization (OIS) to the camera.

In Example 2, which includes the subject matter of Example 1, the apparatus may include a motion detection component to detect motion of the casing and to determine whether the motion arises from unsteady physical support of the casing, the countering movement component to derive the countering movement based on the determination.

In Example 3, which includes the subject matter of any of Examples 1-2, the apparatus may include a motion sensor operable by the motion detection component to detect the motion.

In Example 4, which includes the subject matter of any of Examples 1-3, the apparatus may include a capture component to operate the camera to capture the image of the object, the motion detection component to cooperate with the image capture component to capture a series of images and the motion detection component to compare the series of images to detect the motion.

In Example 5, which includes the subject matter of any of Examples 1-4, the motion detection component may compare a characteristic of the motion to a threshold to determine whether the motion arise from unsteady physical support of the casing.

In Example 6, which includes the subject matter of any of Examples 1-5, the apparatus may include a second actuator of elongate shape coupled to the camera to exert a second mechanical force to pivot the camera about the first axis in a second direction opposite the first direction, the elongate shape of the second actuator may extend into the elongate portion of the casing, the first and second actuators may each include a magnetic shape memory (MSM) actuator, the elongate portion of the casing may include a temple of eyewear and the temple may include the endpiece at one end of the elongate portion and an earpiece at another end of the elongate portion.

In Example 7, which includes the subject matter of any of Examples 1-6, the apparatus may include a linkage coupling the first and second actuators to each other and to the camera to alternately push against and pull on the camera based on which of the first and second mechanical forces are exerted through the linkage, the first actuator positioned between the camera and the second actuator, and the second actuator extending further away from the camera and into the elongate portion from the endpiece than the first actuator.

In Example 8, which includes the subject matter of any of Examples 1-7, the countering movement component may operate the second actuator to pivot the camera in the second direction in another countering movement to provide OIS.

In Example 9, which includes the subject matter of any of Examples 1-8, the apparatus may include a second actuator of elongate shape coupled to the camera to exert a second mechanical force to pivot the camera about a second axis in a second direction, the second axis may cross the first axis, the elongate shape of the second actuator may extend into the elongate portion of the casing, the first and second actuators may each include a magnetic shape memory (MSM) actuator, the elongate portion of the casing may include a temple of eyewear and the temple may include the endpiece at one end of the elongate portion and an earpiece at another end of the elongate portion.

In Example 10, which includes the subject matter of any of Examples 1-9, the apparatus may include a gimbal by which the camera is mounted within the endpiece to pivot about the first and second axes to pivot the line of sight horizontally and vertically.

In Example 11, which includes the subject matter of any of Examples 1-10, the countering movement component may derive the countering movement based on the detected motion and may select the first actuator from among multiple actuators of elongate shape that extend into the elongate portion of the casing to effect the countering movement based on a geometry by which each actuator of the multiple actuators is coupled to the camera, the elongate portion of the casing may include a temple of eyewear and the temple may include the endpiece at one end of the elongate portion and an earpiece at another end of the elongate portion.

In Example 12, which includes the subject matter of any of Examples 1-11, the first actuator may include a magnetic shape memory (MSM) actuator, and the apparatus may include a position detection component to take a measurement of an electrical characteristic of a coil of the first actuator, to correlate the measurement to a degree of change in magnetically-responsive material of the first actuator, and to correlate the degree of change to a current position of the camera.

In Example 13, which includes the subject matter of any of Examples 1-12, the countering movement component may determine whether the countering movement will exceed a physical limit of a range of movement of the camera, and may alter the countering movement based on the determination of whether the countering movement will exceed the physical limit In Example 14, which includes the subject matter of any of Examples 1-13, the apparatus may include a power source, the countering movement component may provide electric power from the power source to the first actuator to operate the first actuator to exert the first mechanical force to pivot the camera in the first direction, and the countering movement component may refrain from providing electric power to the first actuator when the countering movement component does not operate the first actuator to exert the first mechanical force.

In Example 15, which includes the subject matter of any of Examples 1-14, the apparatus may include a display, and a user interface component to operate at least the display to present selectable menu items to enable control by an operator of an aspect of capturing the image.

In Example 16, which includes the subject matter of any of Examples 1-15, the apparatus may include an interface to transmit image data including the image captured of the object to a remote device via a network.

In Example 17, an apparatus to capture images includes a lens movable within a plane that extends across a first portion of a line of sight of an image capture element to pivot a second portion of the line of sight extending beyond the lens and away from the image capture element using refraction; a projection that engages an elongate slot defining an axis of movement to guide the lens along the axis and enable pivoting of a center of the lens out of the axis at the projection at a location away from the center of the lens; first and second actuators to move the lens within the plane, the first actuator to exert a first mechanical force in a first direction, the second actuator to exert a second mechanical force in a second direction, the first and second directions crossing to enable the first and second mechanical forces to cooperate to move the lens along the axis and to enable one of the first and second mechanical forces to pivot the lens out of the axis; and a countering movement component to operate the first and second actuators to move the lens within the plane in a countering movement to provide optical image stabilization (OIS).

In Example 18, which includes the subject matter of Example 17, the apparatus may include a casing in which the image capture element, the lens, the projection, the slot, and the first and second actuators are carried; and a motion detection component to detect motion of the casing and to determine whether the motion arises from unsteady physical support of the casing, the countering movement component to derive the countering movement based on the determination.

In Example 19, which includes the subject matter of any of Examples 17-18, the apparatus may include a motion sensor operable by the motion detection component to detect the motion.

In Example 20, which includes the subject matter of any of Examples 17-19, the apparatus may include a camera including the image capture element and the lens, the OIS provided to improve images captured by the camera; and a capture component to operate the camera to capture the image of the object, the motion detection component to cooperate with the image capture component to capture a series of images and the motion detection component to compare the series of images to detect the motion.

In Example 21, which includes the subject matter of any of Examples 17-20, the motion detection component may compare a characteristic of the motion to a threshold to determine whether the motion arise from unsteady physical support of the casing.

In Example 22, which includes the subject matter of any of Examples 17-21, the apparatus may include a third actuator to move the lens within the plane, the third actuator may exert mechanical force in a third direction, the third direction at least partly in opposition to each of the first and second directions to enable the third mechanical force to move the lens along the axis in a direction opposite to the direction in which the first and second mechanical forces cooperate to move the lens along the axis, and the first, second and third actuators may each include a magnetic shape memory (MSM) actuator.

In Example 23, which includes the subject matter of any of Examples 17-22, the countering movement component may operate the third actuator to move the lens in the third direction in another countering movement to provide OIS.

In Example 24, which includes the subject matter of any of Examples 17-23, the apparatus may include a casing in which the image capture element, the lens, the projection, the slot, and the first and second actuators are carried, and the casing may include a pair of sheet-like portions to engage a frame in which the lens is carried to constrain the lens to moving within the plane.

In Example 25, which includes the subject matter of any of Examples 17-24, the apparatus may include one of the frame and a sheet-like portion of the pair of the sheet-like portions to carry the projection, and the slot formed in the other of the frame and the sheet-like portion.

In Example 26, which includes the subject matter of any of Examples 17-25, the countering movement component may derive the countering movement based on the detected motion, and to select the first and second actuators may effect the countering movement based on a geometry by which at least the first and second actuators are coupled to the lens.

In Example 27, which includes the subject matter of any of Examples 17-26, the apparatus may include a magnetic shape memory (MSM) actuator, and the apparatus may include a position detection component to take a measurement of an electrical characteristic of a coil of the first actuator, to correlate the measurement to a degree of change in magnetically-responsive material of the first actuator, and to correlate the degree of change to a current position of the lens.

In Example 28, which includes the subject matter of any of Examples 17-27, the countering movement component may determine whether the countering movement will exceed a physical limit of a range of movement of the lens, and to alter the countering movement based on the determination of whether the countering movement will exceed the physical limit.

In Example 29, which includes the subject matter of any of Examples 17-28, the apparatus may include a power source, the countering movement component may provide electric power from the power source to the first actuator to operate the first actuator to exert the first mechanical force to either move the lens along the axis or to pivot the lens out of the axis, and the countering movement component may refrain from providing electric power to the first actuator when the countering movement component does not operate the first actuator to exert the first mechanical force.

In Example 30, a computing-implemented method for providing optical image stabilization (OIS) includes detecting motion of a casing of a capture device, the casing comprising an endpiece and a relatively thin and elongate portion that is coupled to and extends from the endpiece; determining whether the detected motion arises from unsteady physical support of the casing; and operating a first actuator of elongate shape coupled to a camera pivotally mounted within the endpiece to exert a first mechanical force to pivot the camera about a first axis in a first direction in a countering movement to provide optical image stabilization (OIS) to the camera based on the determination, the elongate shape of the first actuator extending into the elongate portion of the temple.

In Example 31, which includes the subject matter of Example 30, the method may include deriving the countering movement from the detected motion.

In Example 32, which includes the subject matter of any of Examples 30-31, the method may include selecting the first actuator from multiple actuators of elongate shape that extend into the elongate portion of the casing to effect the countering movement based on a geometry by which each actuator of the multiple actuators is coupled to the camera, the elongate portion of the casing may include a temple of eyewear and the temple may include the endpiece at one end of the elongate portion and an earpiece at another end of the elongate portion.

In Example 33, which includes the subject matter of any of Examples 30-32, the first actuator may include a magnetic shape memory (MSM) actuator; and the method may include taking a measurement of an electrical characteristic of a coil of the first actuator, correlating the measurement to a degree of change in magnetically-responsive material of the first actuator, and correlating the degree of change to a current position of the camera.

In Example 34, which includes the subject matter of any of Examples 30-33, the method may include determining whether the countering movement will exceed a physical limit of a range of movement of the camera, and altering the countering movement based on the determination of whether the countering movement will exceed the physical limit In Example 35, which includes the subject matter of any of Examples 30-34, the method may include providing electric power to the first actuator when the first actuator is operated to exert the first mechanical force to pivot the camera in the first direction, and refraining from providing electric power to the first actuator when the first actuator is not operated to exert the first mechanical force.

In Example 36, which includes the subject matter of any of Examples 30-35, the method may include operating the camera to capture an image along a line of sight of the image capture element of the camera.

In Example 37, which includes the subject matter of any of Examples 30-36, the method may include analyzing the captured image along with other captured images to detect movement of the casing.

In Example 38, which includes the subject matter of any of Examples 30-37, the method may include comparing a characteristic of the motion to a threshold to determine whether the motion arises from unsteady physical support of the casing.

In Example 39, which includes the subject matter of any of Examples 30-38, the method may include operating a second actuator of elongate shape coupled to the camera to exert a second mechanical force to pivot the camera about the first axis in a second direction opposite the first direction, the elongate shape of the second actuator extending into the elongate portion of the casing, the first and second actuators each comprising a magnetic shape memory (MSM) actuator, the elongate portion of the casing may include a temple of eyewear and the temple may include the endpiece at one end of the elongate portion and an earpiece at another end of the elongate portion.

In Example 40, which includes the subject matter of any of Examples 30-39, the method may include operating a second actuator of elongate shape coupled to the camera to exert a second mechanical force to pivot the camera about a second axis in a second direction, the second axis crossing the first axis, the elongate shape of the second actuator extending into the elongate portion of the casing, the first and second actuators each comprising a magnetic shape memory (MSM) actuator, the elongate portion of the casing may include a temple of eyewear and the temple may include the endpiece at one end of the elongate portion and an earpiece at another end of the elongate portion.

In Example 41, which includes the subject matter of any of Examples 30-40, the method may include operating at least a display to present selectable menu items to enable control by an operator of an aspect of capturing the image.

In Example 42, which includes the subject matter of any of Examples 30-41, the method may include transmitting image data including an image captured by the camera to a remote device via a network.

In Example 43, a computing-implemented method for providing optical image stabilization (OIS) includes detecting motion of a casing of a capture device, the capture device including an image capture element, a lens movable within a plane that extends across a first portion of a line of sight of an image capture element, and a projection that engages an elongate slot defining an axis of movement to guide the lens along the axis and enable pivoting of a center of the lens out of the axis at the projection at a location away from the center of the lens; determining whether the motion arises from unsteady physical support of the casing; and operating first and second actuators to move the lens within the plane to pivot a second portion of the line of sight extending beyond the lens and away from the image capture element using refraction to provide optical image stabilization (OIS), the first actuator to exert a first mechanical force in a first direction, the second actuator to exert a second mechanical force in a second direction, the first and second directions crossing to enable the first and second mechanical forces to cooperate to move the lens along the axis and to enable one of the first and second mechanical forces to pivot the lens out of the axis.

In Example 44, which includes the subject matter of Example 43, the method may include deriving the countering movement from the detected motion.

In Example 45, which includes the subject matter of any of Examples 43-44, the method may include selecting the first and second actuators to effect the countering movement based on a geometry by which at least the first and second actuators are coupled to the lens.

In Example 46, which includes the subject matter of any of Examples 43-45, the first actuator may include a magnetic shape memory (MSM) actuator; and the method may include taking a measurement of an electrical characteristic of a coil of the first actuator, correlating the measurement to a degree of change in magnetically-responsive material of the first actuator, and correlating the degree of change to a current position of the lens.

In Example 47, which includes the subject matter of any of Examples 43-46, the method may include determining whether the countering movement will exceed a physical limit of a range of movement of the lens, and altering the countering movement based on the determination of whether the countering movement will exceed the physical limit In Example 48, which includes the subject matter of any of Examples 43-47, the method may include providing electric power to the first actuator when the first actuator is operated to exert the first mechanical force to move the lens, and refraining from providing electric power to the first actuator when the first actuator is not operated to exert the first mechanical force.

In Example 49, which includes the subject matter of any of Examples 43-48, the method may include operating the image capture element to capture an image along the second portion of the line of sight.

In Example 50, which includes the subject matter of any of Examples 43-49, the method may include analyzing the captured image along with other captured images to detect movement of the casing.

In Example 51, which includes the subject matter of any of Examples 43-50, the method may include comparing a characteristic of the motion to a threshold to determine whether the motion arises from unsteady physical support of the casing.

In Example 52, which includes the subject matter of any of Examples 43-51, the method may include operating a third actuator to move the lens within the plane, the third actuator to exert mechanical force in a third direction, the third direction at least partly in opposition to each of the first and second directions to enable the third mechanical force to move the lens along the axis in a direction opposite to the direction in which the first and second mechanical forces cooperate to move the lens along the axis, and the first, second and third actuators may each include a magnetic shape memory (MSM) actuators.

In Example 53, which includes the subject matter of any of Examples 43-52, the method may include operating the third actuator to move the lens in the third direction in another countering movement to provide OIS.

In Example 54, which includes the subject matter of any of Examples 43-53, the method may include operating at least a display to present selectable menu items to enable control by an operator of an aspect of capturing the image.

In Example 55, which includes the subject matter of any of Examples 43-54, the method may include transmitting image data including an image captured by the camera to a remote device via a network.

In Example 56, at least one machine-readable storage medium includes instructions that when executed by a computing device, cause the computing device to detect motion of a casing of a capture device, the casing comprising an endpiece and a relatively thin and elongate portion that is coupled to and extends away from the endpiece; determine whether the detected motion arises from unsteady physical support of the casing; and operate a first actuator of elongate shape coupled to a camera pivotally mounted within the endpiece to exert a first mechanical force to pivot the camera about a first axis in a first direction in a countering movement to provide optical image stabilization (OIS) to the camera based on the determination, the elongate shape of the first actuator extending into the elongate portion of the temple.

In Example 57, which includes the subject matter of Example 56, the computing device may be caused to derive the countering movement from the detected motion.

In Example 58, which includes the subject matter of any of Examples 56-57, the computing device may be caused to select the first actuator from multiple actuators of elongate shape that extend into the elongate portion of the casing to effect the countering movement based on a geometry by which each actuator of the multiple actuators is coupled to the camera, the elongate portion of the casing may include a temple of eyewear and the temple may include the endpiece at one end of the elongate portion and an earpiece at another end of the elongate portion.

In Example 59, which includes the subject matter of any of Examples 56-58, the computing device may be caused to take a measurement of an electrical characteristic of a coil of the first actuator, correlate the measurement to a degree of change in magnetically-responsive material of the first actuator, and correlate the degree of change to a current position of the camera.

In Example 60, which includes the subject matter of any of Examples 56-59, the computing device may be caused to determine whether the countering movement will exceed a physical limit of a range of movement of the camera and alter the countering movement based on the determination of whether the countering movement will exceed the physical limit.

In Example 61, which includes the subject matter of any of Examples 56-60, the computing device may be caused to provide electric power to the first actuator when the first actuator is operated to exert the first mechanical force to pivot the camera in the first direction, and refrain from providing electric power to the first actuator when the first actuator is not operated to exert the first mechanical force.

In Example 62, which includes the subject matter of any of Examples 56-61, the computing device may be caused to operate the camera to capture an image along a line of sight of the image capture element of the camera.

In Example 63, which includes the subject matter of any of Examples 56-62, the computing device may be caused to analyze the captured image along with other captured images to detect movement of the casing.

In Example 64, which includes the subject matter of any of Examples 56-63, the computing device may be caused to compare a characteristic of the motion to a threshold to determine whether the motion arises from unsteady physical support of the casing.

In Example 65, which includes the subject matter of any of Examples 56-64, the computing device may be caused to operate a second actuator of elongate shape coupled to the camera to exert a second mechanical force to pivot the camera about the first axis in a second direction opposite the first direction, the elongate shape of the second actuator extending into the elongate portion of the casing, the first and second actuators each comprising a magnetic shape memory (MSM) actuator, the elongate portion of the casing may include a temple of eyewear and the temple may include the endpiece at one end of the elongate portion and an earpiece at another end of the elongate portion.

In Example 66, which includes the subject matter of any of Examples 56-65, the computing device may be caused to operate a second actuator of elongate shape coupled to the camera to exert a second mechanical force to pivot the camera about a second axis in a second direction, the second axis crossing the first axis, the elongate shape of the second actuator extending into the elongate portion of the casing, the first and second actuators each comprising a magnetic shape memory (MSM) actuator, the elongate portion of the casing may include a temple of eyewear and the temple may include the endpiece at one end of the elongate portion and an earpiece at another end of the elongate portion.

In Example 67, which includes the subject matter of any of Examples 56-66, the computing device may be caused to operate at least a display to present selectable menu items to enable control by an operator of an aspect of capturing the image.

In Example 68, which includes the subject matter of any of Examples 56-67, the computing device may be caused to transmit image data including an image captured by the camera to a remote device via a network.

In Example 69, at least one machine-readable storage medium includes instructions that when executed by a computing device, cause the computing device to detect motion of a casing of a capture device, the capture device including an image capture element, a lens movable within a plane that extends across a first portion of a line of sight of an image capture element, and a projection that engages an elongate slot defining an axis of movement to guide the lens along the axis and enable pivoting of a center of the lens out of the axis at the projection at a location away from the center of the lens; determine whether the motion arises from unsteady physical support of the casing; and operate first and second actuators to move the lens within the plane to pivot a second portion of the line of sight extending beyond the lens and away from the image capture element using refraction to provide optical image stabilization (OIS), the first actuator to exert a first mechanical force in a first direction, the second actuator to exert a second mechanical force in a second direction, the first and second directions crossing to enable the first and second mechanical forces to cooperate to move the lens along the axis and to enable one of the first and second mechanical forces to pivot the lens out of the axis.

In Example 70, which includes the subject matter of Example 69, the computing device may be caused to derive the countering movement from the detected motion.

In Example 71, which includes the subject matter of any of Examples 69-70, the computing device may be caused to select the first and second actuators to effect the countering movement based on a geometry by which at least the first and second actuators are coupled to the lens.

In Example 72, which includes the subject matter of any of Examples 69-71, the first actuator including a magnetic shape memory (MSM) actuator; and the computing device may be caused to take a measurement of an electrical characteristic of a coil of the first actuator, correlate the measurement to a degree of change in magnetically-responsive material of the first actuator, and correlate the degree of change to a current position of the lens.

In Example 73, which includes the subject matter of any of Examples 69-72, the computing device may be caused to determine whether the countering movement will exceed a physical limit of a range of movement of the lens, and alter the countering movement based on the determination of whether the countering movement will exceed the physical limit In Example 74, which includes the subject matter of any of Examples 69-73, the computing device may be caused to provide electric power to the first actuator when the first actuator is operated to exert the first mechanical force to move the lens, and refrain from providing electric power to the first actuator when the first actuator is not operated to exert the first mechanical force.

In Example 75, which includes the subject matter of any of Examples 69-74, the computing device may be caused to operate the image capture element to capture an image along the second portion of the line of sight.

In Example 76, which includes the subject matter of any of Examples 69-75, the computing device may be caused to analyze the captured image along with other captured images to detect movement of the casing.

In Example 77, which includes the subject matter of any of Examples 69-76, the computing device may be caused to compare a characteristic of the motion to a threshold to determine whether the motion arises from unsteady physical support of the casing.

In Example 78, which includes the subject matter of any of Examples 69-77, the computing device may be caused to operate a third actuator to move the lens within the plane, the third actuator may exert mechanical force in a third direction, the third direction at least partly in opposition to each of the first and second directions to enable the third mechanical force to move the lens along the axis in a direction opposite to the direction in which the first and second mechanical forces cooperate to move the lens along the axis, and the first, second and third actuators may each include a magnetic shape memory (MSM) actuator.

In Example 79, which includes the subject matter of any of Examples 69-78, the computing device may be caused to operate the third actuator to move the lens in the third direction in another countering movement to provide OIS.

In Example 80, which includes the subject matter of any of Examples 69-79, the computing device may be caused to operate at least a display to present selectable menu items to enable control by an operator of an aspect of capturing the image.

In Example 81, which includes the subject matter of any of Examples 69-80, the computing device may be caused to transmit image data including an image captured by the camera to a remote device via a network.

In Example 82, an apparatus to capture images includes a casing defining a temple of eyewear, the temple including a front endpiece, an earpiece and an elongate portion extending between the front endpiece and the earpiece; a camera pivotally mounted within the front endpiece, the camera including an image capture element to capture an image of an object along a line of sight of the image capture element; a first magnetic shape memory (MSM) actuator coupled to the camera to exert a first mechanical force to pivot the camera about a first axis in a first direction, the first MSM actuator extending into the elongate portion of the temple; a second MSM actuator coupled to the camera to exert a second mechanical force to pivot the camera about a second axis in a second direction, the second MSM actuator extending into the elongate portion of the temple; and a countering movement component to operate the first and second MSM actuators to pivot the camera in the first and second directions in a countering movement to pivot the line of sight to provide optical image stabilization (OIS) during capture of the image.

In Example 83, which includes the subject matter of Example 82, the camera may be pivotally mounted within the gimbal to pivot about the first and second axes in response to the exertion of the first and second mechanical forces.

In Example 84, which includes the subject matter of any of Examples 82-83, the apparatus may include a motion sensor operable to detect motion imparted to the casing; and a motion detection component to determine whether the detected motion arises from unsteady physical support of the casing, the countering movement component to derive the countering movement based on the determination.

In Example 85, which includes the subject matter of any of Examples 82-84, the apparatus may include an interface to transmit image data including the image to a remote device via a network.

In Example 86, an apparatus to capture images includes a camera including a lens and an image capture element, the lens movable within a plane that extends across a first portion of a line of sight of the image capture element to pivot a second portion of the line of sight extending beyond the lens and away from the image capture element using refraction; a projection that engages an elongate slot defining an axis of movement to guide the lens along the axis and enable pivoting of a center of the lens out of the axis at the projection at a location away from the center of the lens; first and second magnetic shape memory (MSM) actuators to move the lens within the plane, the first actuator to exert a first mechanical force in a first direction, the second actuator to exert a second mechanical force in a second direction, the first and second directions crossing to enable the first and second mechanical forces to cooperate to move the lens along the axis and to enable one of the first and second mechanical forces to pivot the lens out of the axis; and a countering movement component to operate the first and second MSM actuators to move the lens within the plane in a countering movement to pivot the second portion of the line of sight to provide optical image stabilization (OIS) during operation of the camera to capture an image.

In Example 87, which includes the subject matter of Example 86, the apparatus may include a third MSM actuator to move the lens within the plane, the third actuator to exert mechanical force in a third direction, the third direction at least partly in opposition to each of the first and second directions to enable the third mechanical force to move the lens along the axis in a direction opposite to the direction in which the first and second mechanical forces cooperate to move the lens along the axis.

In Example 88, which includes the subject matter of any of Examples 86-87, the apparatus may include a casing in which the camera, the projection and the first and second MSM actuators are carried; a motion sensor operable to detect motion imparted to the casing; and a motion detection component to determine whether the detected motion arises from unsteady physical support of the casing, the countering movement component to derive the countering movement based on the determination.

In Example 89, which includes the subject matter of any of Examples 86-88, one of the lens, the frame and a portion of an interior of the casing may carry the projection, and the slot may be formed in another of the lens, the frame and the portion of the interior of the casing.

In Example 90, at least one machine-readable storage medium may include instructions that when executed by a computing device, cause the computing device to perform any of the above.

In Example 91, an apparatus to capture images may include means for performing any of the above.

The invention claimed is:

1. An apparatus to capture images comprising:
   a camera pivotally mounted within an endpiece of a casing, the camera comprising an image capture element to capture an image of an object along a line of sight of the image capture element;
   a first actuator of elongate shape coupled to a first rear portion of the camera, the first actuator to elongate toward the endpiece to exert a first mechanical force against the first rear portion to pivot the camera about a first axis in a first direction;
   a second actuator of elongate shape coupled to a second rear portion of the camera, the second actuator to elongate toward the endpiece to exert a second mechanical force against the second rear portion to pivot the camera about the first axis in a second direction, the second direction opposite the first direction, the elongate shape of the first actuator and the second actuator extending into the casing; and
   a countering movement component to operate one of the first actuator or the second actuator to pivot the camera in one of the first direction or the second direction in a countering movement to provide optical image stabilization (OIS) to the camera.

2. The apparatus of claim 1, comprising a motion detection component to detect motion of the casing and to determine whether the motion arises from unsteady physical support of the casing, the countering movement component to derive the countering movement based on the determination.

3. The apparatus of claim 1, the first and second actuators each comprising a magnetic shape memory (MSM) actuator, an elongate portion of the casing comprising a temple of eyewear and the temple comprising the endpiece at one end of the elongate portion and an earpiece at another end of the elongate portion.

4. The apparatus of claim 1, the first and second actuators coupled to each other and to the camera to alternately push against and pull on the camera based on which of the first and second mechanical forces are exerted through the linkage, the first actuator positioned between the camera and the second actuator, and the second actuator extending further away from the camera and into an elongate portion of the casing from the endpiece than the first actuator.

5. The apparatus of claim 1, the second actuator to pivot the camera about a second axis the second axis crossing the first axis, the elongate shape of the second actuator extending into an elongate portion of the casing, the first and second actuators each comprising a magnetic shape memory (MSM) actuator, the elongate portion of the casing comprising a temple of eyewear and the temple comprising the endpiece at one end of the elongate portion and an earpiece at another end of the elongate portion.

6. The apparatus of claim 1, elongation of the first actuator to cause the second actuator to compress, and elongation of the second actuator to cause the first actuator to compress.

7. An apparatus to capture images comprising:
   a casing defining a temple of eyewear, the temple comprising a front endpiece, an earpiece and an elongate portion extending between the front endpiece and the earpiece;
   a camera pivotally mounted within the front endpiece, the camera comprising an image capture element to capture an image of an object along a line of sight of the image capture element;
   a first magnetic shape memory (MSM) actuator coupled to a first rear portion of the camera, the first MSM actuator to extend toward the front endpiece to exert a first mechanical force against the first rear portion to pivot the camera about a first axis in a first direction, the first MSM actuator extending into the elongate portion of the temple; and
   a second MSM actuator coupled to a second rear portion of the camera, the second MSM actuator to extend toward the front endpiece to exert a second mechanical force against the second rear portion to pivot the camera about a second axis in a second direction opposite the first direction, the second MSM actuator extending into the elongate portion of the temple; and
   a countering movement component to operate the first and second MSM actuators to pivot the camera in the first and second directions in a countering movement to pivot the line of sight to provide optical image stabilization (OIS) during capture of the image.

8. The apparatus of claim 7, comprising a gimbal, the camera pivotally mounted within the gimbal to pivot about the first and second axes in response to the exertion of the first and second mechanical forces.

9. The apparatus of claim 7, comprising:
   a motion sensor operable to detect motion imparted to the casing; and
   a motion detection component to determine whether the detected motion arises from unsteady physical support of the casing, the countering movement component to derive the countering movement based on the determination.

10. The apparatus of claim 7, elongation of the first MSM actuator to cause the second MSM actuator to compress, and elongation of the second MSM actuator to cause the first MSM actuator to compress.

11. A computer-implemented method for providing optical image stabilization (OIS) comprising:
    detecting motion of a casing of a capture device, the casing comprising an endpiece;
    determining whether the detected motion arises from unsteady physical support of the casing;
    operating one of:
      a first actuator of elongate shape coupled to a first rear portion of a camera pivotally mounted within the endpiece, the first actuator to elongate toward the endpiece to exert a first mechanical force against the first rear portion to pivot the camera about a first axis in a first direction,
      and a second actuator of elongate shape coupled to a second rear portion of the camera, the second actuator to elongate toward the endpiece to exert a second mechanical force to pivot the camera about the first axis in a second direction, the second direction opposite the first direction; and
    providing optical image stabilization (OIS) to the camera based on the determination via pivoting the camera in one of the first direction or the second direction.

12. The computer-implemented method of claim 11, the method comprising deriving the countering movement from the detected motion.

13. The computer-implemented method of claim 12, the method comprising selecting the first actuator from a plurality of actuators of elongate shape to effect the countering movement based on a geometry by which each actuator of the plurality of actuators is coupled to the camera.

14. The computer-implemented method of claim 13, the first actuator comprising a magnetic shape memory (MSM) actuator, and the method comprising:
- taking a measurement of an electrical characteristic of a coil of the first actuator;
- correlating the measurement to a degree of change in magnetically-responsive material of the first actuator; and
- correlating the degree of change to a current position of the camera.

15. The computer-implemented method of claim 14, the method comprising:
- determining whether the countering movement will exceed a physical limit of a range of movement of the camera; and
- altering the countering movement based on the determination of whether the countering movement will exceed the physical limit.

16. The computer-implemented method of claim 11, the method comprising:
- providing electric power to the first actuator when the first actuator is operated to exert the first mechanical force to pivot the camera in the first direction; and
- refraining from providing electric power to the first actuator when the first actuator is not operated to exert the first mechanical force.

17. The computer-implemented method of claim 11, the method comprising:
- operating the camera to capture an image along a line of sight of the image capture element of the camera; and
- analyzing the captured image along with other captured images to detect movement of the casing.

18. The computer-implemented method of claim 11, the method comprising:
- compressing the first actuator via elongation of the second actuator; and
- compressing the second actuator via elongation of the first actuator.

19. At least one non-transitory machine-readable storage medium comprising instructions that when executed by a computing device, cause the computing device to:
- detect motion of a casing of a capture device, the casing comprising an endpiece;
- determine whether the detected motion arises from unsteady physical support of the casing;
- operate one of:
  - a first actuator of elongate shape coupled to a first rear portion of a camera pivotally mounted within the endpiece, the first actuator to elongate toward the endpiece to exert a first mechanical force against the first rear portion to pivot the camera about a first axis in a first direction,
  - and a second actuator of elongate shape coupled to a second rear portion of the camera, the second actuator to elongate toward the endpiece to exert a second mechanical force to pivot the camera about the first axis in a second direction, the second direction opposite the first direction; and
- providing optical image stabilization (OIS) to the camera based on the determination via pivoting the camera in one of the first direction or the second direction.

20. The at least one non-transitory machine-readable storage medium of claim 19, the computing device caused to:
- provide electric power to the first actuator when the first actuator is operated to exert the first mechanical force to pivot the camera in the first direction; and
- refrain from providing electric power to the first actuator when the first actuator is not operated to exert the first mechanical force.

21. The at least one non-transitory machine-readable storage medium of claim 19, the computing device caused to:
- operate the camera to capture an image along a line of sight of the image capture element of the camera; and
- analyze the captured image along with other captured images to detect movement of the casing.

22. The at least one non-transitory machine-readable storage medium of claim 19, the computing device caused to compare a characteristic of the motion to a threshold to determine whether the motion arises from unsteady physical support of the casing.

23. The at least one non-transitory machine-readable storage medium of claim 19, the elongate shape of the second actuator extending into the elongate portion of the casing, the first and second actuators each comprising a magnetic shape memory (MSM) actuator, an elongate portion of the casing comprising a temple of eyewear and the temple comprising the endpiece at one end of the elongate portion and an earpiece at another end of the elongate portion.

24. The at least one non-transitory machine-readable storage medium of claim 19, the computing device caused to operate the second actuator exert the second mechanical force to pivot the camera about a second axis in the second direction, the second axis crossing the first axis, the elongate shape of the second actuator extending into an elongate portion of the casing, the first and second actuators each comprising a magnetic shape memory (MSM) actuator, the elongate portion of the casing comprising a temple of eyewear and the temple comprising the endpiece at one end of the elongate portion and an earpiece at another end of the elongate portion.

25. The at least one machine-readable storage medium of claim 19, the computing device caused to:
- compress the first actuator via elongation of the second actuator; and
- compress the second actuator via elongation of the first actuator.

* * * * *